Figure 1:
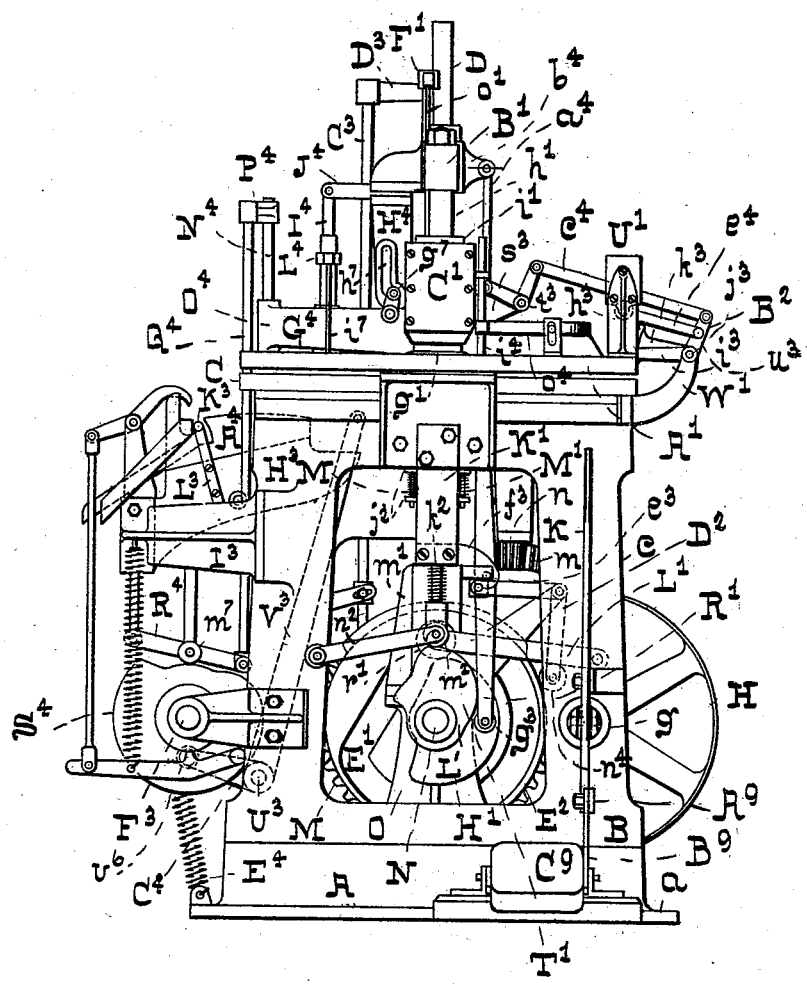

(No Model.) 17 Sheets—Sheet 1.

J. S. DETRICK.
MACHINE FOR MAKING ALL TOBACCO CIGARETTES.

No. 552,104. Patented Dec. 31, 1895.

WITNESSES
Dan'l Fisher
Elmer V. Potter

INVENTOR
Jacob S. Detrick,
by G. H. W. T. Howard,
Atty.

(No Model.) 17 Sheets—Sheet 2.

J. S. DETRICK.
MACHINE FOR MAKING ALL TOBACCO CIGARETTES.

No. 552,104. Patented Dec. 31, 1895.

-WITNESSES-
Dan'l Fisher
Elmer L. Potter

-INVENTOR-
Jacob S. Detrick (No Model.)  17 Sheets—Sheet 3.

J. S. DETRICK.
MACHINE FOR MAKING ALL TOBACCO CIGARETTES.

No. 552,104. Patented Dec. 31, 1895.

(No Model.) 17 Sheets—Sheet 4.

J. S. DETRICK.
MACHINE FOR MAKING ALL TOBACCO CIGARETTES.

No. 552,104. Patented Dec. 31, 1895.

WITNESSES
Dan'l Fisher
Elmer V. Potter

INVENTOR
Jacob S. Detrick

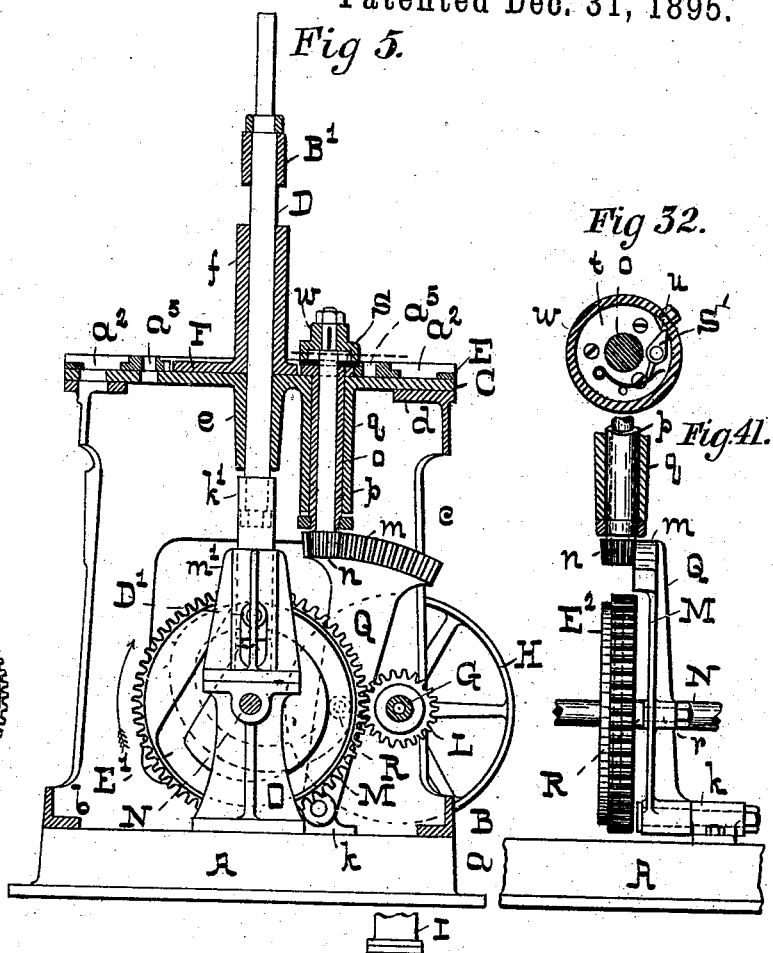

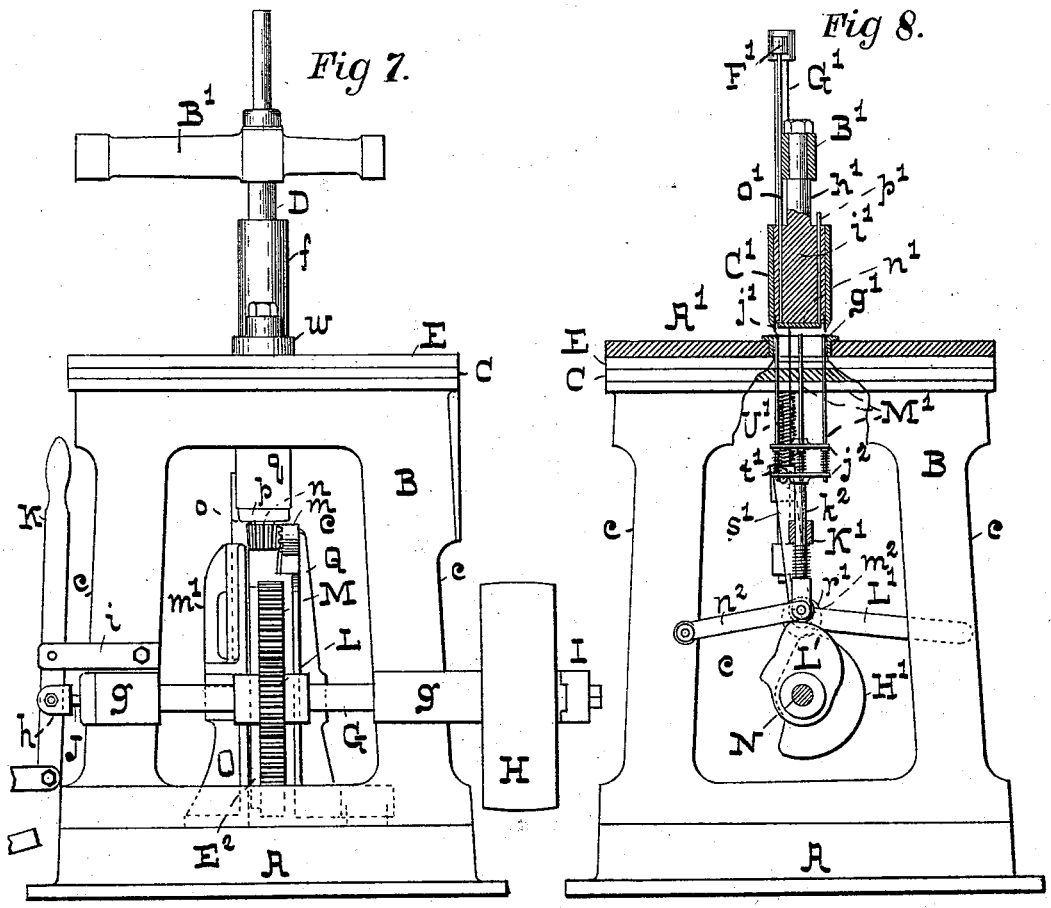

(No Model.) 17 Sheets—Sheet 7.
J. S. DETRICK.
MACHINE FOR MAKING ALL TOBACCO CIGARETTES.
No. 552,104. Patented Dec. 31, 1895.
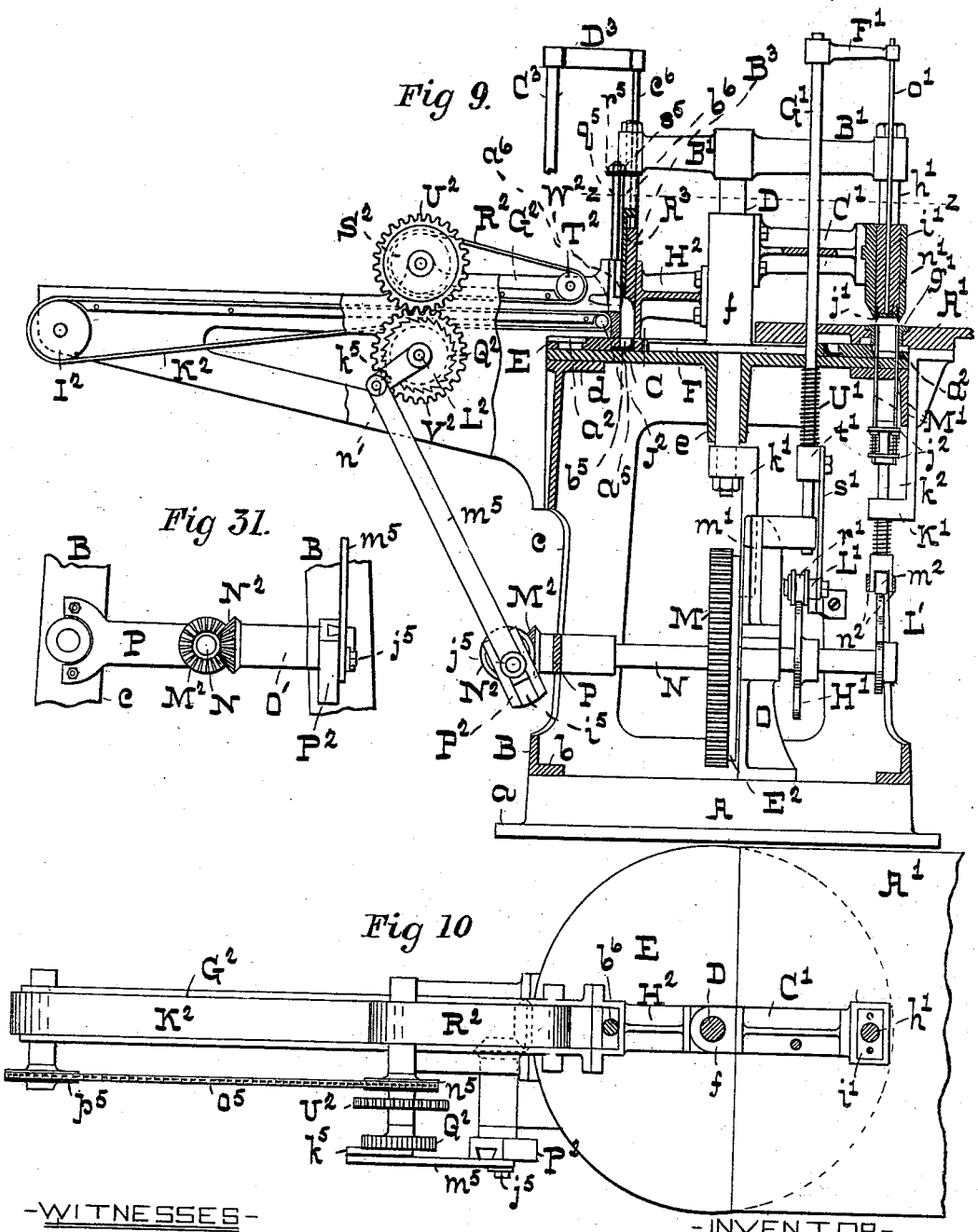
WITNESSES
Dan'l Fisher
Elmer V. Potter
INVENTOR
Jacob S. Detrick,
by Geo. W. T. Howard
Atty.

(No Model.)    17 Sheets—Sheet 8.

J. S. DETRICK.
MACHINE FOR MAKING ALL TOBACCO CIGARETTES.

No. 552,104.    Patented Dec. 31, 1895.

WITNESSES
Dan'l Fisher
Elmer V. Potter

INVENTOR
Jacob S. Detrick,
by Chas. W. J. Mead,
Atty.

(No Model.) 17 Sheets—Sheet 9.
J. S. DETRICK.
MACHINE FOR MAKING ALL TOBACCO CIGARETTES.
No. 552,104. Patented Dec. 31, 1895.

—WITNESSES—
Dan'l Fisher
Elmer L. Potter

—INVENTOR—
Jacob S. Detrick (No Model.) 17 Sheets—Sheet 11.
J. S. DETRICK.
MACHINE FOR MAKING ALL TOBACCO CIGARETTES.

No. 552,104. Patented Dec. 31, 1895.

WITNESSES
Dan'l Fisher
Elmer V. Potter

INVENTOR
Jacob S. Detrick,
by G.H.W.T. Kinard,
Atty.

(No Model.) 17 Sheets—Sheet 12.
J. S. DETRICK.
MACHINE FOR MAKING ALL TOBACCO CIGARETTES.
No. 552,104. Patented Dec. 31, 1895.
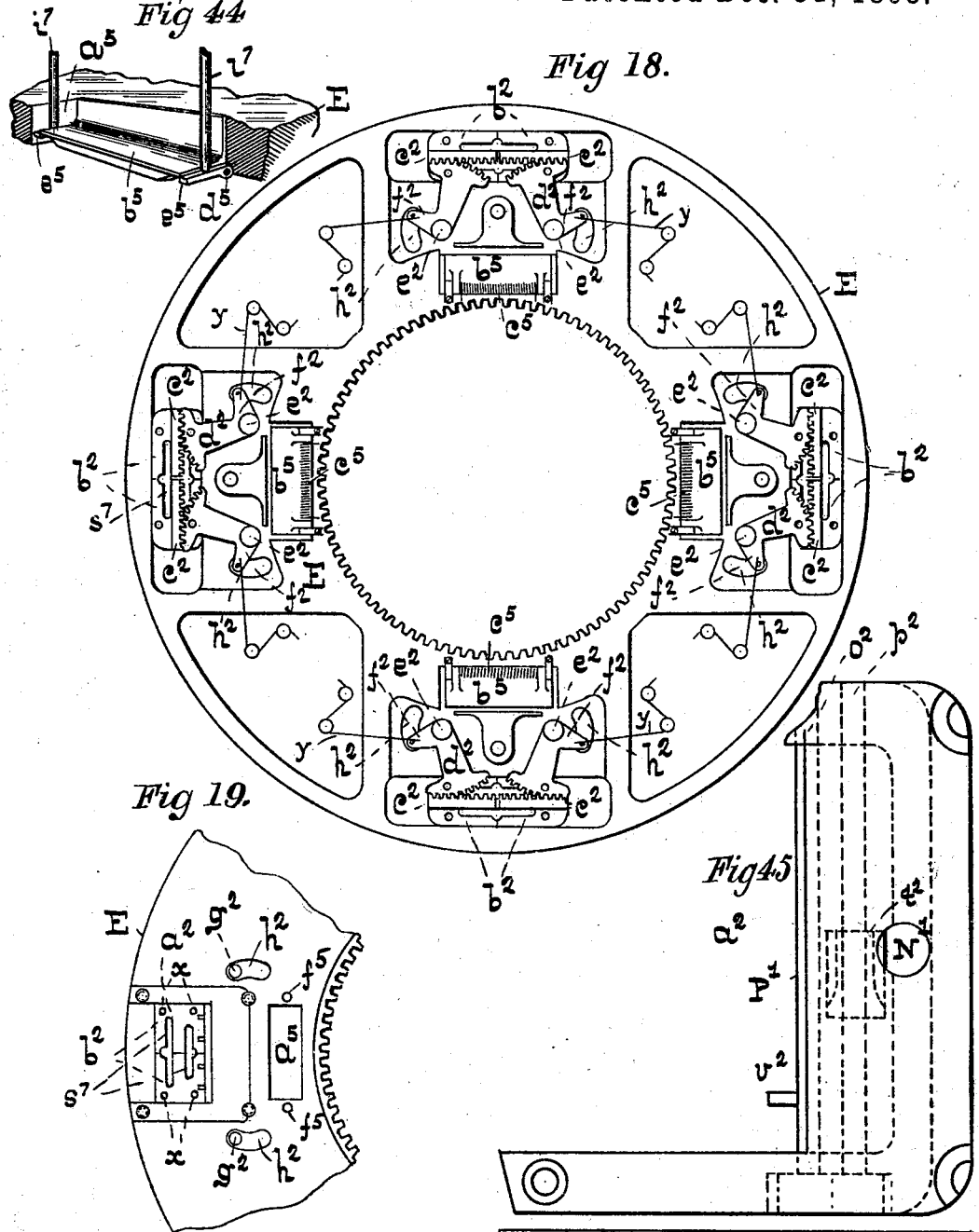
WITNESSES—
Dan'l Fisher
Elmer E. Potter
Jacob S. Detrick,
by Geo. W. S. Howard,
atty.

(No Model.)
17 Sheets—Sheet 13
J. S. DETRICK.
MACHINE FOR MAKING ALL TOBACCO CIGARETTES.
No. 552,104.
Patented Dec. 31, 1895.
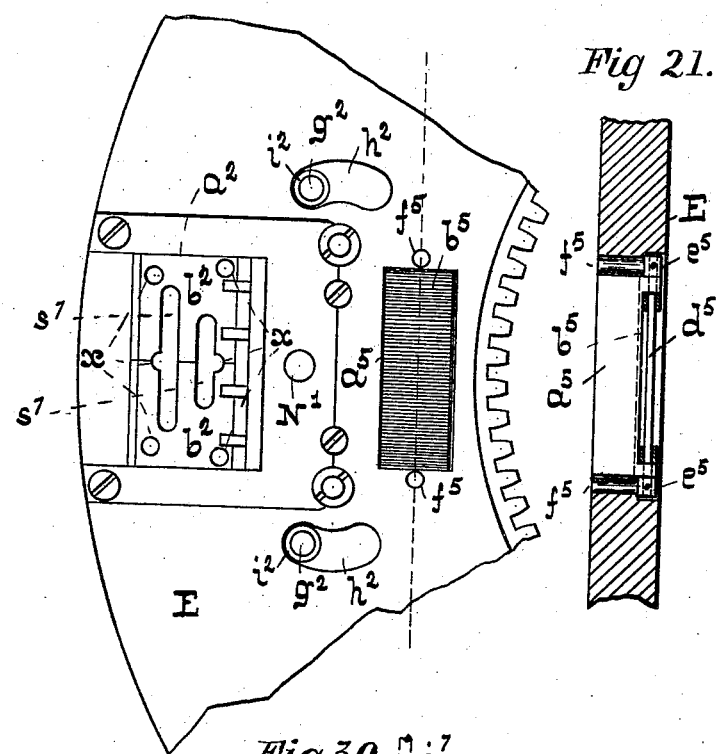
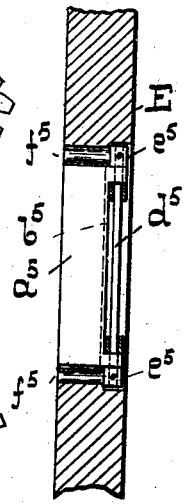
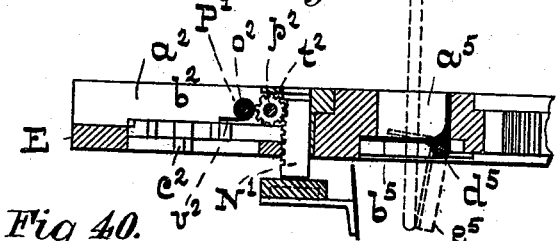
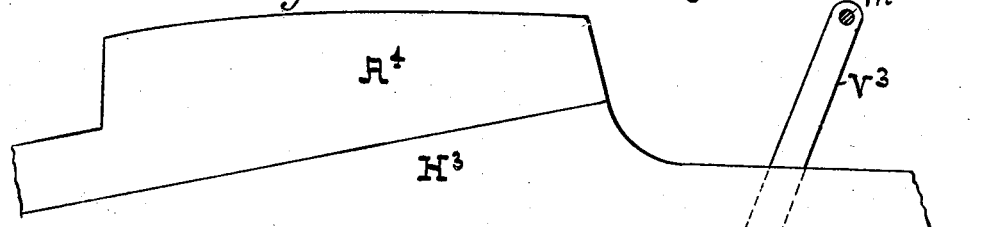
WITNESSES
Dan'l Fisher
Elmer E. Potter
INVENTOR
Jacob S. Detrick,
by G.W.T. Heard
Atty.

(No Model.) 17 Sheets—Sheet 14.
J. S. DETRICK.
MACHINE FOR MAKING ALL TOBACCO CIGARETTES.
No. 552,104. Patented Dec. 31, 1895.
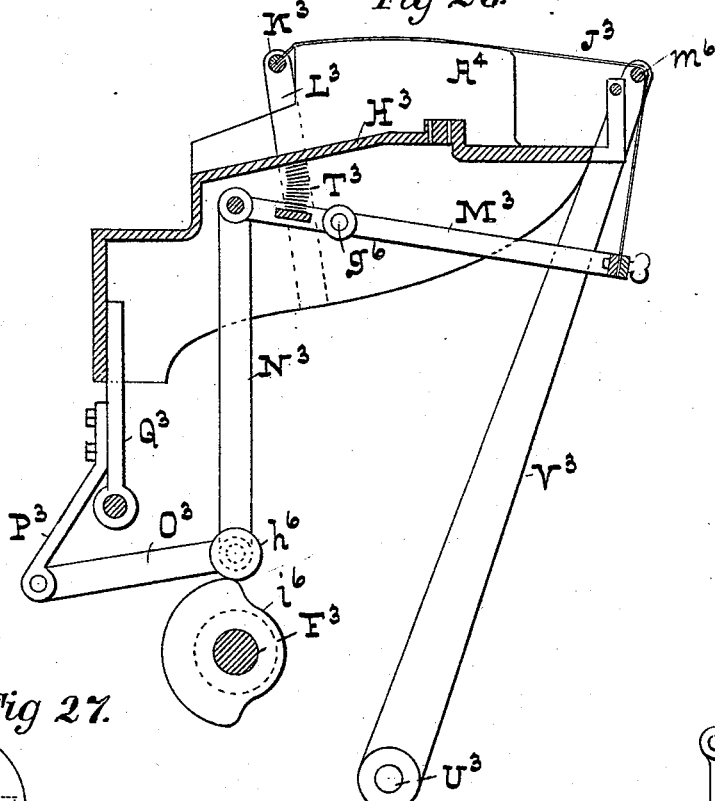
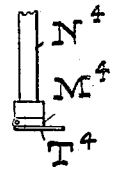
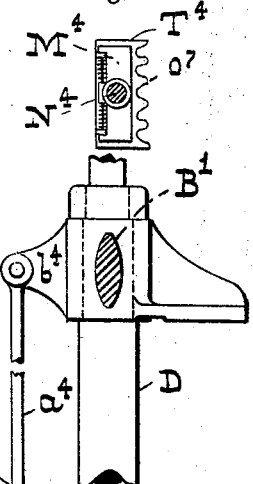
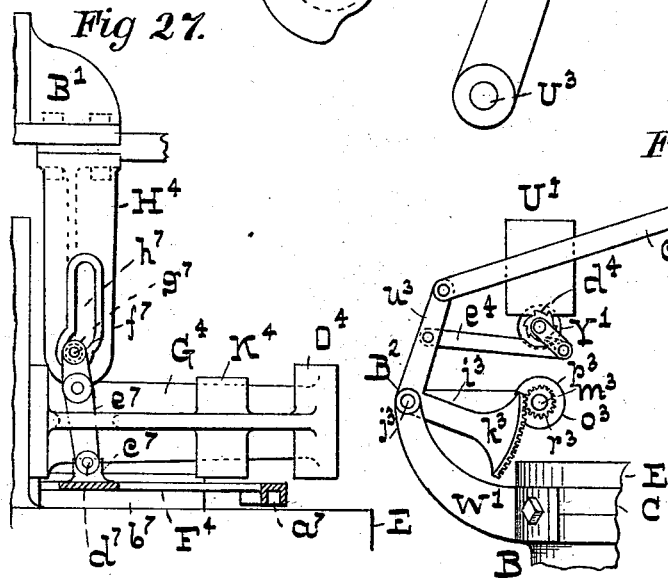
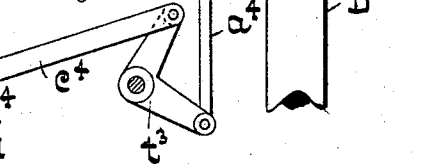
WITNESSES
Dan'l Fisher
Elmer V. Potter
INVENTOR
Jacob S. Detrick
by Geo. W. J. Dinard
Attys.

(No Model.) 17 Sheets—Sheet 15.

J. S. DETRICK.
MACHINE FOR MAKING ALL TOBACCO CIGARETTES.

No. 552,104. Patented Dec. 31, 1895.

WITNESSES
Dan'l Fisher
Elmer V. Potter

INVENTOR
Jacob S. Detrick,
by Geo. W. T. Ward,
Atty.

(No Model.) 17 Sheets—Sheet 16.
J. S. DETRICK.
MACHINE FOR MAKING ALL TOBACCO CIGARETTES.
No. 552,104. Patented Dec. 31, 1895.
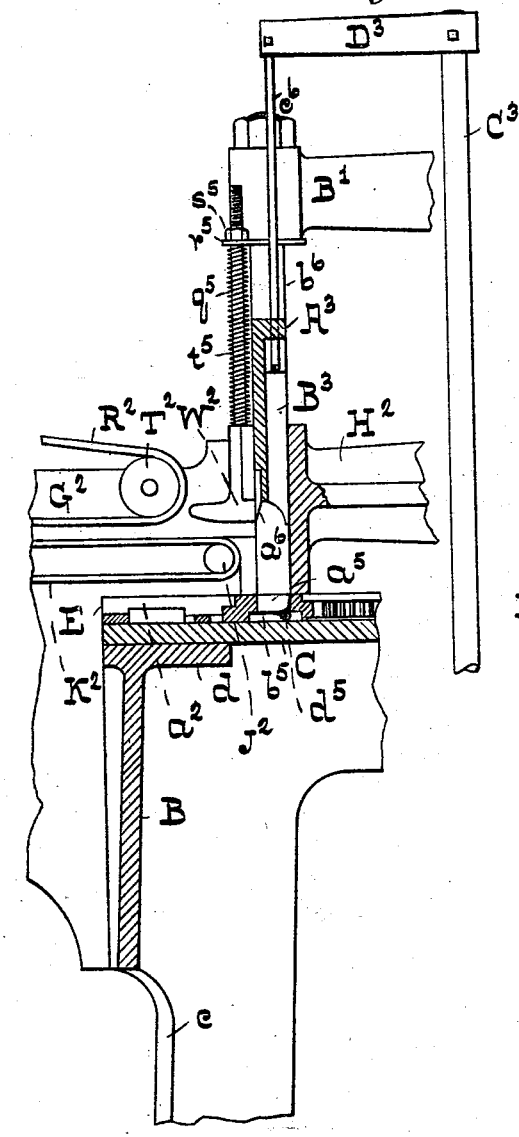
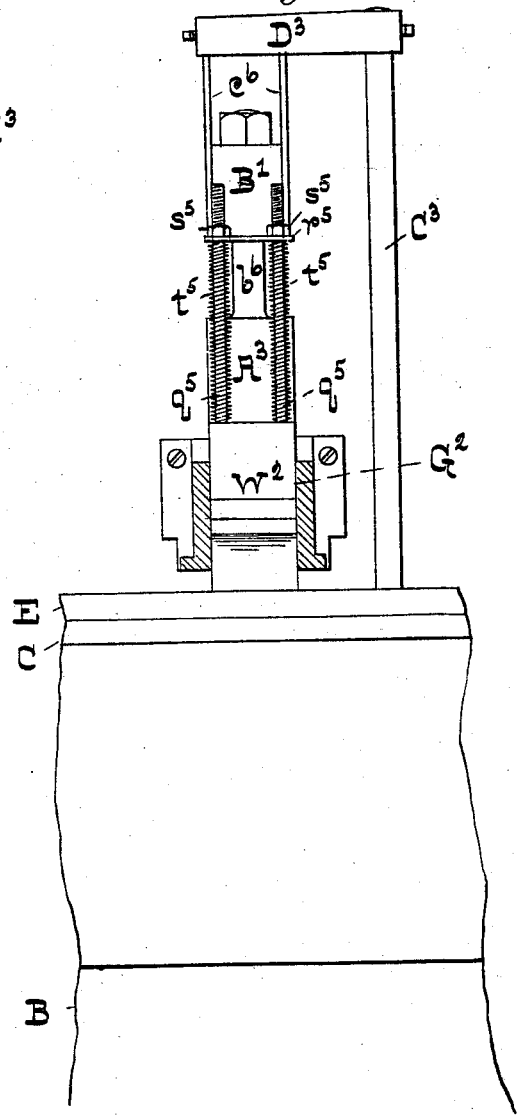

(No Model.) 17 Sheets—Sheet 17.
J. S. DETRICK.
MACHINE FOR MAKING ALL TOBACCO CIGARETTES.
No. 552,104. Patented Dec. 31, 1895.
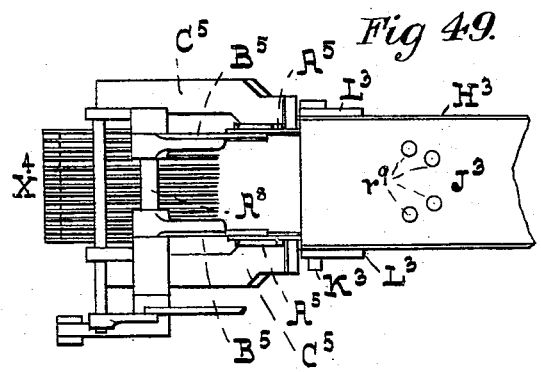
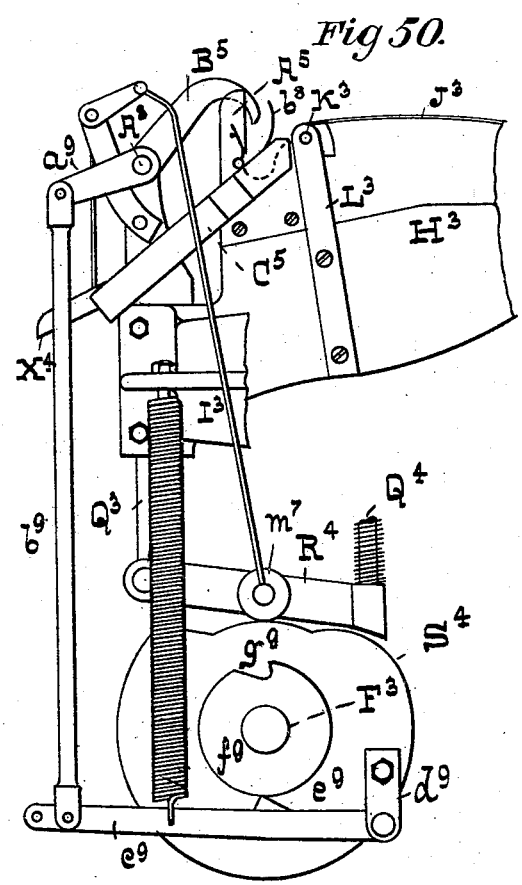
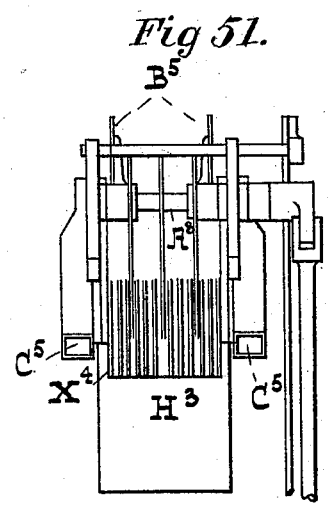
WITNESSES—
Dan'l Fisher
Elmer V. Potter
INVENTOR—
Jacob S. Detrick,
by Geo. W. T. Heard,
atty.

UNITED STATES PATENT OFFICE.

JACOB S. DETRICK, OF BALTIMORE, MARYLAND, ASSIGNOR TO THE DETRICK & HARVEY MACHINE COMPANY OF BALTIMORE CITY, OF MARYLAND, AND HERMAN ELLIS, OF PARADISE, MARYLAND.

MACHINE FOR MAKING ALL-TOBACCO CIGARETTES.

SPECIFICATION forming part of Letters Patent No. 552,104, dated December 31, 1895.

Application filed February 19, 1895. Serial No. 538,951. (No model.)

*To all whom it may concern:*

Be it known that I, JACOB S. DETRICK, of the city of Baltimore and State of Maryland, have invented certain Improvements in Machines for Making All-Tobacco Cigarettes, of which the following is a specification.

This invention relates to a machine for making all-tobacco cigarettes, wherein a full and complete operation of the machine embodies four distinct sub-operations, viz: the cutting of a wrapper from a tobacco-leaf, the pasting of a wrapper, the severing of a charge of filler from a continuous filler, and the rolling up of a charge of filler in a wrapper. These four steps in the production of a cigarette, are performed successively and simultaneously, so that at each step one cigarette is finished, or four cigarettes completed in a full operation of the machine, as will hereinafter fully appear.

In the description of the said invention which follows reference is made to the accompanying drawings, forming a part hereof, and in which—

Figure 2:
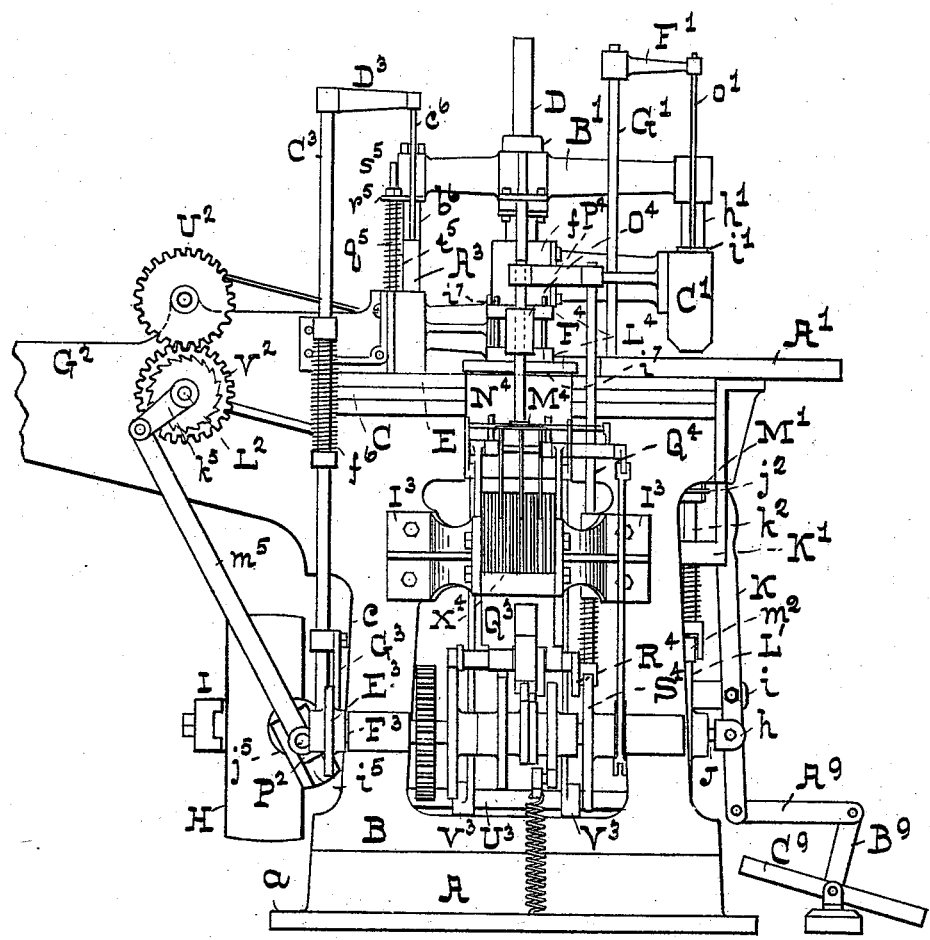
Figure 3:
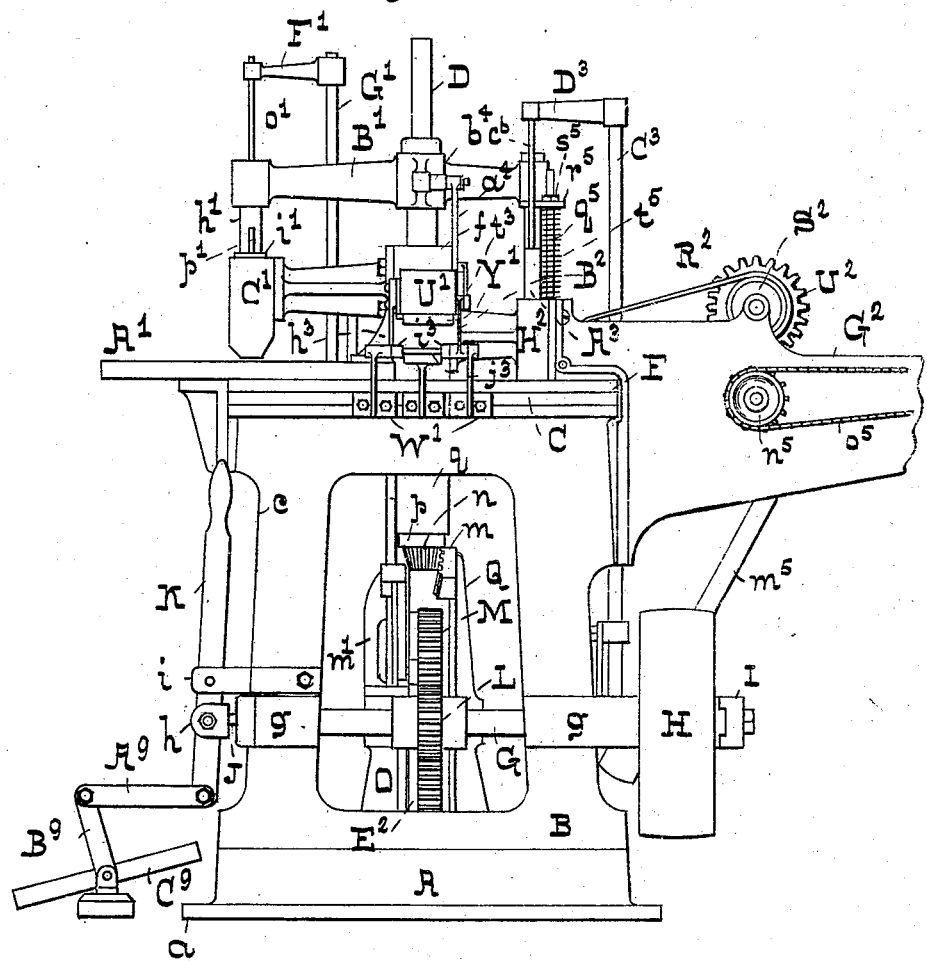
Figure 4:
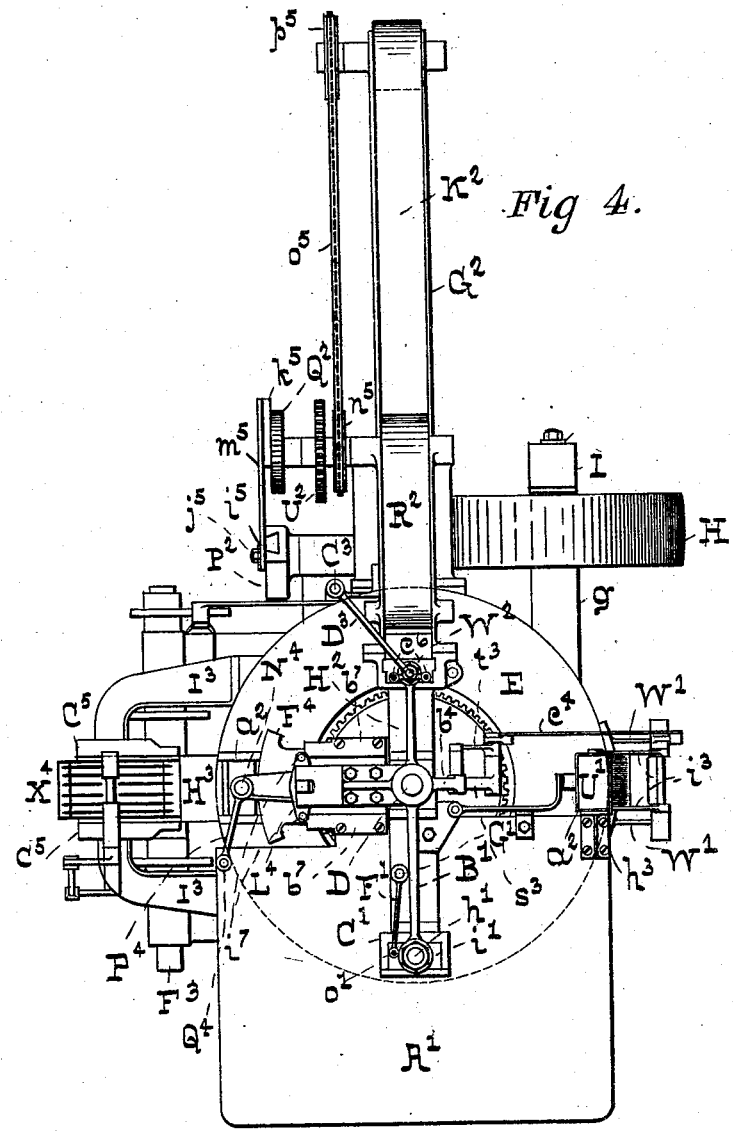
Figure 11:
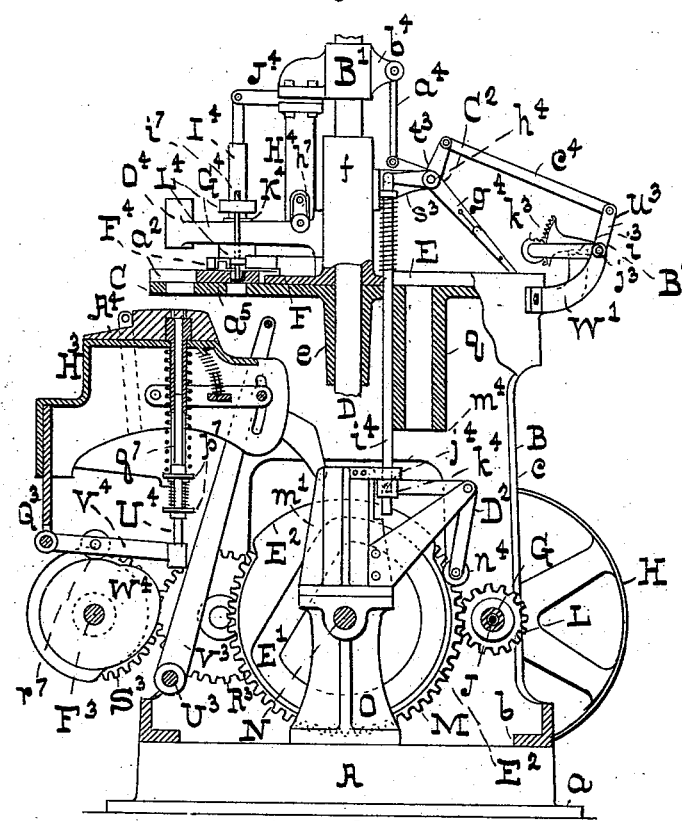
Figure 23:
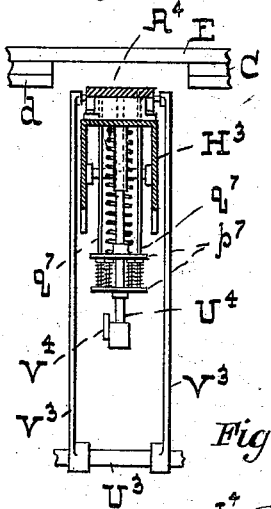
Figure 12:
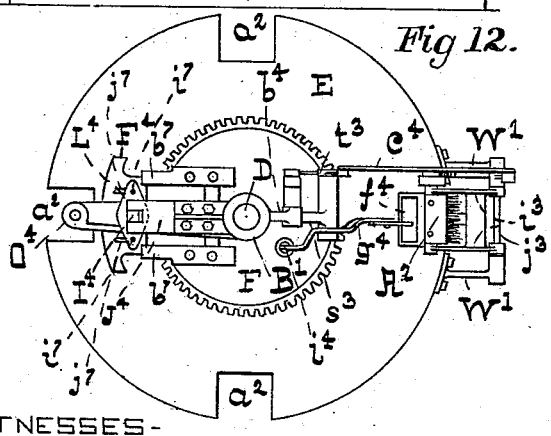
Figure 43:
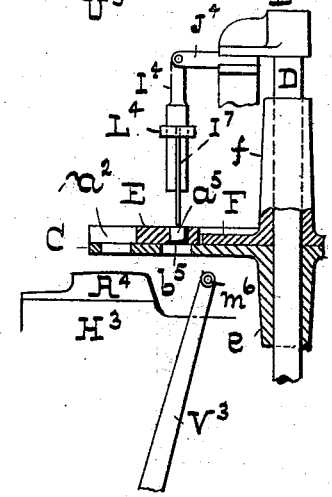
Figure 13:
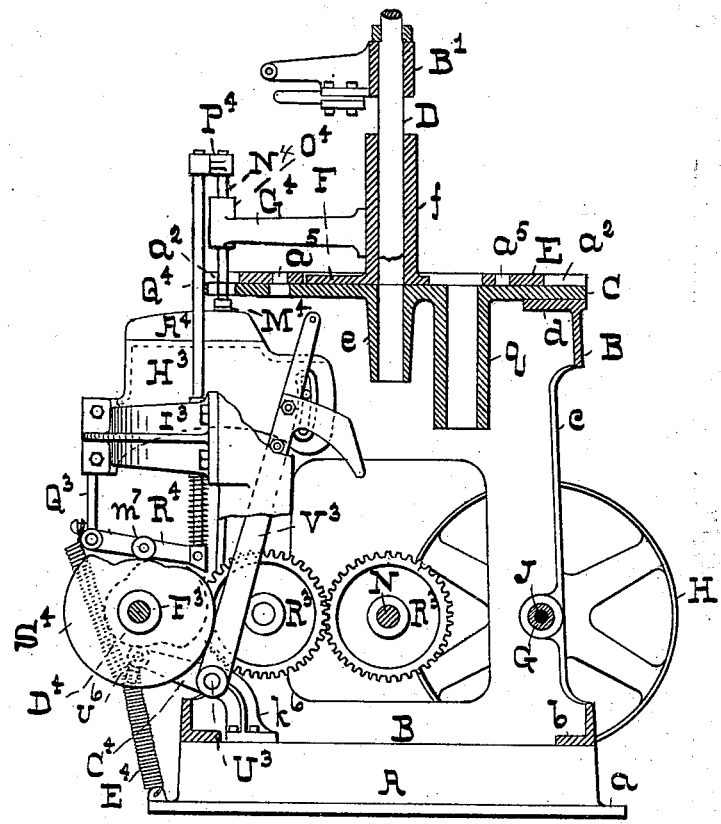
Figure 14:
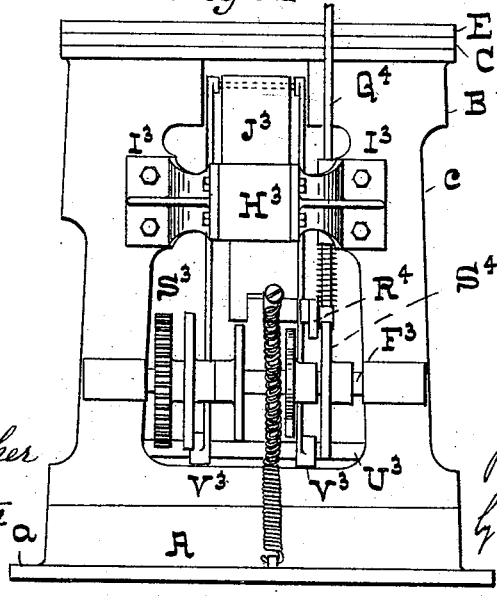
Figure 15:
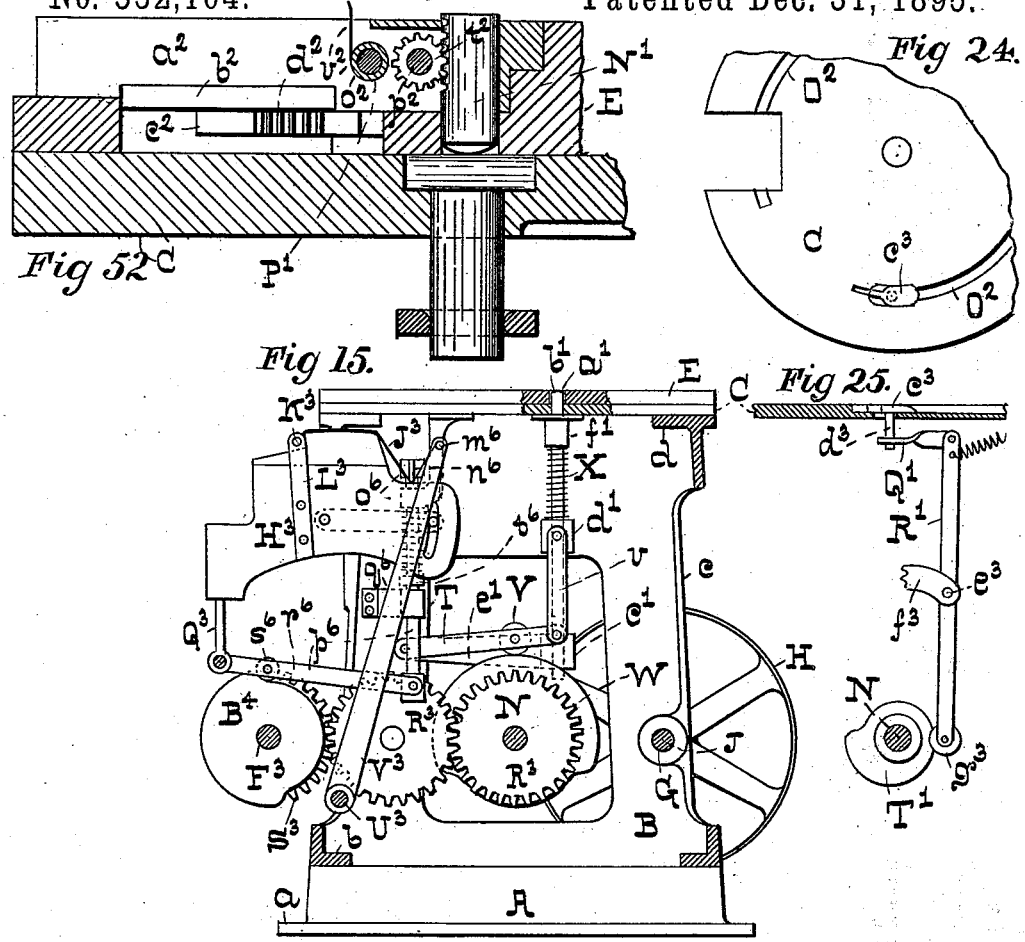
Figure 16:
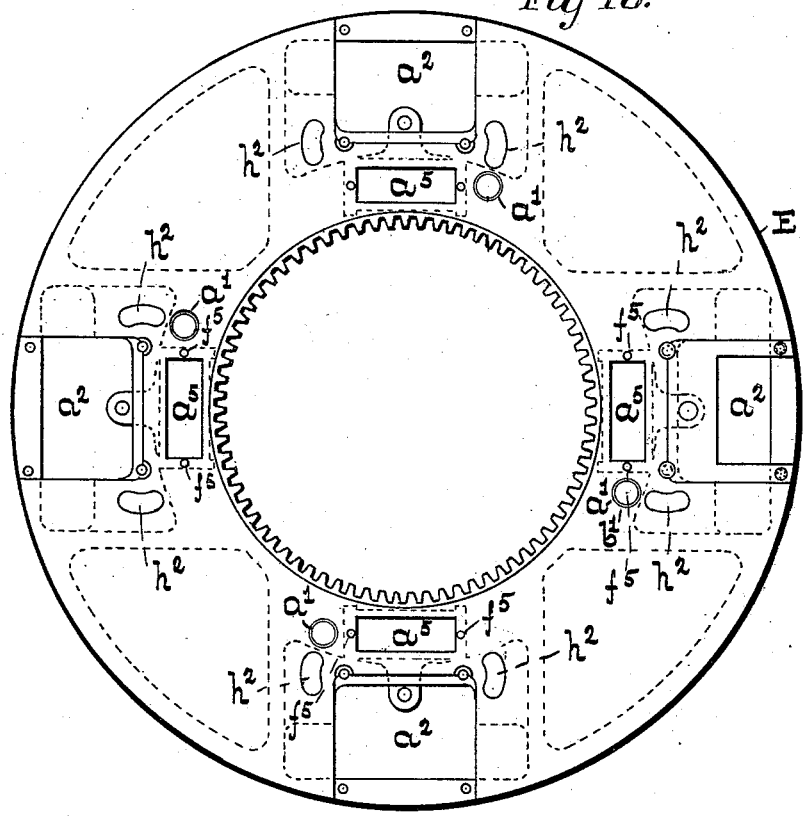
Figure 17:
Figure 33:
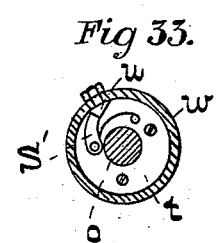
Figure 34:
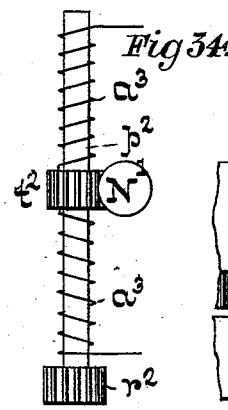
Figure 35:
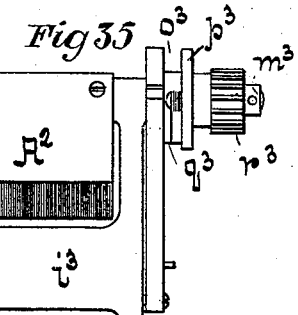
Figure 36:
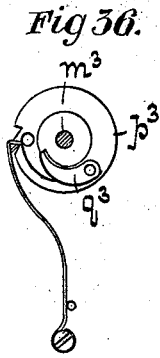

Figure 1 is a front view of the machine. Fig. 2 is a side view. Fig. 3 is a reverse side view. Fig. 4 is a plan. Fig. 5 is a partly-sectional front view of the machine with certain parts thereof removed. Fig. 6 is a plan of Fig. 5. Fig. 7 is a side view of the machine with certain parts thereof removed. Fig. 8 is a partly-sectional front view with certain parts thereof removed. Fig. 9 is a partly-sectional side view with certain parts thereof removed. Fig. 10 is a section of Fig. 9 taken on the dotted line $z\ z$. Fig. 11 is a sectional front view of the machine with certain parts thereof removed. Fig. 12 is a top view of Fig. 11. Fig. 13 is a sectional side view with certain parts thereof removed. Fig. 14 is an exterior side view with certain parts thereof removed. Fig. 15 is a front view with certain parts thereof removed. Fig. 16 is an enlarged top view of an intermittently-rotated table forming a part of the machine. Fig. 17 is a transverse section of Fig. 16. Fig. 18 is an enlarged under side view of Fig. 16. Figs. 19 to 52, inclusive, are details of the machine, all of which, except Figs. 19, 23, 24, 25, 31, 42, and 43 are enlarged.

Referring now to the drawings, A is the base of the machine, consisting of a hollow cylindrical casting with a flange $a$ whereby it is secured to the floor.

B is the main frame, which consists of a hollow frustum of a cone, with four openings $c$ which give access to its interior. At its lower end it has a flange $b$ whereby it is secured to the base A, and at the upper end, another flange $d$ to which a circular head C is fastened. In the center of the head C is a downwardly-extending boss $e$, in which a spindle D is fitted to have a vertical movement only.

E is an annular table of the same diameter as the head C, and F a plate secured to the head C, having an upwardly-extending central boss $f$ which serves as an additional guide for the spindle D. The annular table E is susceptible of a circumferential movement about the spindle D, but in the operation of the machine it has an intermittent rotary motion of one-fourth of a revolution. In other words, the table moves around a distance equal to a quarter of a revolution, then stops for a period of time equal to, say, that occupied in performing the said quarter-revolution, then moves on again another quarter, and then stops as before, as will hereinafter fully appear. The mechanism whereby this intermittent circumferential motion of the table is accomplished consists as follows:

G is the main driving-shaft supported in suitable bearing-boxes $g$ cast as a part of the frame B. At one end of the driving-shaft G is a loose driving-pulley H, having its outer end or face provided with clutch-teeth adapted to engage with a clutch I susceptible of a longitudinal movement on a feather, to admit of its engagement and disengagement with the clutch-face of the pulley. To move the clutch, the driving-shaft is bored throughout its length, and in the hole thus formed is a longitudinally-moving rod J, having a collar which comes in contact with the clutch. At the other end the rod J is provided with a slotted block $h$.

K is a lever having a handle at its upper end, fulcrumed to a bracket $i$ projecting from the frame B. This hand-lever is pivoted to the slotted block $h$, so that by a movement of the lever the clutch can be either connected with or disengaged from the clutch-face of the driving-pulley, to start or stop the operation of the machine. To the driving-shaft G is keyed a pinion L, which is in engagement with a master gear-wheel M fastened to the secondary shaft N, which is supported by a stand O, and also by a cross-bar P (see Fig. 31) bolted to the frame B and which spans the rear opening c therein.

Q is a lever pivoted to a bracket k on the top of the base A, having a toothed sector m at its upper end, which is in gear with a beveled pinion n on a vertical shaft o. (See Figs. 5 and 41.) This shaft o is adapted to turn within a revoluble sleeve p, which is supported in a bearing q, pendent from the under side of the fixed head C of the frame B.

R is a roller on a stud r on the front face of the lever Q, (see Fig. 41,) which enters an irregular groove s' in the rear face of the master gear-wheel (see Fig. 42) and rests against the edges or faces of the groove which constitute the cam. In the rotation of the master gear-wheel M, the lever Q with its toothed segment m is made to vibrate, and there is such proportion between the diameter of the beveled pinion n and the stroke of the sector m that the said pinion at each stroke of the sector, makes one revolution and then returns to its original position. In other words, in the operation of the machine, the pinion n makes one complete revolution in one direction, and then returns or makes a complete revolution in the other.

As before stated, the table E is annular, and it will be seen that its inner edge is provided with teeth after the manner of a gear-wheel, as shown in Figs. 16, 17, 18, 19 and 20. The sleeve p, which is loose in the bearing q, terminates at its upper end in a pinion S (see Figs. 5 and 6) which is in engagement with the teeth on the inner edge of the annular table E, and the pitch diameters of the pinion and the teeth on the table are as four to one. In other words, should the pinion be made to revolve once, the table will make one-fourth of a revolution only.

S' is a spring-held pawl (see Figs. 32 and 33) on a small plate t on the upper face of a pinion S, and which is adapted to engage with a single tooth u in a circular cup w which is keyed to the shaft o.

From the foregoing description it will be seen that upon each revolution of the master-wheel M the lever Q with its toothed sector m makes one double stroke, which causes the beveled pinion n with its shaft o to make a complete revolution in one direction, and another complete revolution in a contrary direction. Now it will be seen that in one direction of rotation of the beveled pinion n and its shaft the pawl S' will effect a complete revolution of the sleeve p and the pinion S, which is in gear with the teeth of the annular table E, and that in its reverse revolution the pawl is inoperative to move the sleeve and pinion and only clicks in passing the tooth u. As the same time is occupied in the rotation of the shaft o in both directions, it is evident that the table will stop after each quarter-revolution for the same period of time as that occupied in performing the said quarter-revolution.

While the mechanism described is theoretically adapted to effect accuracy in the distance moved by the table at each revolution of the pinion S, in practice, means are required to make the movements of the table mathematically correct. I effect this result by providing the head C with one hole and the table E with four registering holes a' at a common distance apart, and arrange a dowel-pin b' to pass into the registering holes (see Fig. 15) at the moment that the table completes its quarter-revolution and thereby hold the table accurately in position during the cigarette-making operations which are then being performed. Before the table starts again on its quarter-revolution the dowel-pin has to be withdrawn from the hole a', as will be readily understood.

To actuate the dowel-pin and at the same time support it I extend that device in a downward direction through a bearing-bracket c', which projects from some part of the frame B, and secure to the dowel-pin a block d'. The said bracket has an arm e' leading horizontally from its lower end, to which is pivoted a lever T, which at its outer end is connected to the block d' by a link v. (See Fig. 15.) The lever T carries a roller V, which rests on the circumference of a cam W on the secondary shaft N, which is of such shape as will effect the operation of the dowel-pin b' before described. As the cam serves only to lift the dowel-pin b', I effect its downward movement and retain the roller V in contact with the cam W by means of a spiral spring X, which is confined endwise between the upper bearing f' of the dowel-pin and the block d'. This spring is compressed in the upward motion of the dowel-pin, and in its extension pushes down the dowel-pin when the cam W allows it to fall.

A' is a stationary table, (see Figs. 1, 2, 3, 4, 9 and 10,) shown as of rectangular shape, secured over the intermittently-rotated table E, but elevated slightly above it so as not to interfere with its action. In this stationary table is fastened the die g', which, in connection with a punch hereinafter described, cuts wrappers for the cigarettes from a tobacco-leaf, and, as a matter of course, the die is of the same size and shape as the wrappers to be produced.

B' is a cross-head secured to the spindle D, and it therefore has a vertical reciprocating movement in common with the spindle. To the front end of the cross-head B' is attached a downwardly-extending bar h', having a block i' at its lower end. This block is guided by a bracket C' extending from the central boss f of the plate F. The block i' carries the punch $j'$ adapted to fit the die $g'$. The vertical reciprocating movement of the spindle D, and consequently that of the punch $j'$, is produced as follows: At the lower end of the spindle D is an offset-arm $k'$ supported by a stand $m'$ bolted to or formed integral with the stand O before referred to. D' (see Fig. 5) is a roller on the rear face of the offset-arm $k'$ which enters a cam-slot E' in the front face of the master gear-wheel M. (See Fig. 9.) The edges bounding the slot E' in the front face of the master-wheel M are operative as in the case of the slot $s'$ in the rear face of the said wheel, and the punch cuts out four wrappers at each revolution of the table E, or one at each quarter-revolution.

As the wrapper when cut by the punch must be pushed from the die and downward into a pocket arranged for its reception in the intermittently-rotated annular table E, as hereinafter fully described, the said punch is provided with a plunger-plate $n'$ (see Figs. 8 and 9) which fits its interior, and is attached to the lower ends of two small rods $o'$ and $p'$ which pass through the block $i'$. The rod $o'$ is longer than the one $p'$ and is attached to the outer end of an arm F' on the upper end of a vertically-reciprocating bar G'. This bar passes through the stationary table A' and also through the head C at a point inside of the teeth of the revoluble table so as not to interfere with the operation of that device, and through the bracket C' in which it is free to slide. It receives its reciprocal motion from a cam H' on the secondary shaft N through the medium of a lever L' (see Fig. 8) pivoted to the frame B, and carrying a roller $r'$ which rests on the periphery of the cam, and a link $s'$ which unites the said lever to a block $t'$ on the bar G'. A spring U' wound around the bar G' and confined endwise between the block $t'$ and the under side of the head C, retains the roller $r'$ in contact with the face or edge of the cam H'.

The intermittently-rotated annular table E, before briefly referred to, has four wrapper-pockets $a^2$ at equal distances apart, into which the wrappers as cut from the leaf are forced by the plunger-plate $n'$. (See Figs. 6, 12, 16, 17, 18 and 19.) These pockets have each a disappearing bottom consisting of two sliding doors $b^2$, (see Figs. 18, 19, 20, 22, 39 and 52,) which come together at the center of the pocket. The sliding doors $b^2$ have racks $c^2$ on their side with which toothed sectors $d^2$ engage. Fig. 18 is an under side view of the intermittently-rotated annular table E with its attachments. These toothed sectors are pivoted at $e^2$ to the table E and have levers $f^2$ carrying pins $g^2$, which project through curved slots $h^2$ in the said table, and have rollers $i^2$ at their ends. (See Fig. 20.) Springs $y$, (shown in Fig. 18,) serve to yieldingly hold the sectors in the position shown in that figure. The projecting pins $g^2$ are used to open the doors $b^2$ to admit of the wrapper being carried downward to the rolling-up table, as will hereinafter fully appear.

It is necessary to have some support for the wrapper when cut by the punch and die from the leaf to keep it in an extended condition until it reaches the sliding doors $b^2$. To effect this support, a holder $j^2$ is placed directly under the doors $b^2$ and fastened to a vertical rod $k^2$ adapted to have a sliding movement in a hanger K'. (See Figs. 8 and 9.) The lower end of the sliding rod $k^2$ has a roller $m^2$, which rests on the edge of a cam L' and is supported laterally so as not to be thrown out of place by the motion of the cam, by means of links $n^2$, which extend from the frame B. The roller $m^2$ is retained in contact with the edge of the cam L' by a spring coiled about the rod $k^2$ and confined endwise between the hanger K' and the block on the end of the rod which carries the roller $m^2$.

M' M' are spring-held stems, preferably four in number, projecting from the holder $j^2$. These stems pass through holes in the sliding doors $b^2$ when closed and come in contact with the under side of the wrapper a moment before it is cut from the leaf. The holes in the sliding doors are shown in Figs. 18, 19 and 20 and marked $x$. When the wrapper is cut, it is held between the ends of these stems and the plunger-plate $n'$, and while thus held it is carried down by the plunger-plate and the yielding stems to the sliding doors $b^2$, upon which it is left.

The wrapper is subsequently subjected to a pasting operation, hereinafter described, and as the said operation has a tendency to slide the wrapper in the pocket toward the periphery of the revoluble table it is necessary that the wrapper should be firmly held. To hold the wrapper, each pocket has two spindles $o^2$ and $p^2$, the former in the pocket and the latter in the rear of the pocket and within a recess in the intermittently-rotated table, which is not seen from the top. (See Figs. 22, 39 and 52.) The spindles are geared together at one end, the gears being represented by $q^2$ and $r^2$, and at the center of the spindle $p^2$ is a third pinion $t^2$, (see Figs. 22, 39 and 52,) in gear with teeth on a cylindrical rack N', the lower end of which enters a circular groove $O^2$ in the head C. (See Figs. 22, 24 and 25.)

P' is a sleeve fastened tightly around the stem $o^2$, provided with spring-fingers $v^2$, adapted to rest on the edge of the wrapper.

Spiral springs $a^3$, coiled about the stem $p^2$, (see Fig. 34,) serve to keep the cylindrical rack N' down on the bottom of the circular groove $O^2$ (see Fig. 22) in the head C, and at the same time make the fingers $v^2$ bear on the wrapper.

From the above description it will be understood that when the cylindrical rack is on the bottom of the circular groove $O^2$ in the head C the fingers $v^2$ remain on the wrapper; but should the said groove have any obstruction in it of such character as to raise the cylindrical rack the said fingers will be turned up and carried to a position where they will not interfere with the introduction of the wrapper into the pocket. As the fingers $v^2$ have to be in the elevated position described when the pocket is under the wrapper-cutting punch, continuity of the circular groove $O^3$ is broken, as shown in Figs. 24 and 25, and the said spring-fingers are elevated as they approach and pass under the punch, as shown in Fig. 52. Now it is necessary that the fingers $v^2$ should remain up until the wrapper is fully down on the sliding doors $b^2$, after which they must suddenly drop and press on the wrapper. This is effected by placing in the groove $O^3$ a block $c^3$, which practically fills up the said groove for a short distance. The block $c^3$ has a stem $d^3$ on its under side, which is connected by a link $Q'$ to the upper end of the spring-held lever $R'$, fulcrumed at $e^3$ to a projection $f^3$ on the hanger $K'$. The lower end of the said lever has a roller $g^3$, which is held against a cam $T'$ on the secondary shaft $N$. (See Fig. 25.) At the time that the fingers have to be released, so as to drop on and hold the wrapper, the cam $T'$ throws back the lever $R'$, and the block $c^3$, passing from under the cylindrical rack $N'$, allows that device to fall to its normal position, which, as before described, causes the fingers to fall. At the time that one wrapper-pocket is being supplied with a wrapper the next pocket in advance, which has been supplied, is opposite the wrapper-pasting devices, which will now be described.

$U'$ is a paste-box (see Figs. 1, 4 and 28) supported by a bracket $h^3$ from the stationary table $A'$, and $Y'$ a roller which revolves partially within the paste-box.

$W'$ is a bracket bolted to the frame $B$, and $i^3$ a brush-holder connected to the bracket $W'$ by a rod $j^3$.

$A^2$ is a brush arranged to turn in the brush-holder, to which it is united by a shaft $m^3$. A clutch $o^3$ is fastened to the shaft $m^3$, (see Fig. 28,) and the clutch is turned by means of a disk $p^3$, carrying a pawl $q^3$ and a pinion $r^3$, which are free to revolve loosely on the said shaft. (See Figs. 28 and 35.)

$B^2$ is a bell-crank placed loosely on the rod $j^3$, one arm of which has a toothed sector $k^3$ in gear with the pinion $r^3$. The other arm $u^3$ is used to operate the pasting mechanism, as will hereinafter appear.

On the central bearing $f$ of the spindle $D$ is a bracket $s^3$, to which is pivoted a bell-crank $t^3$. (See Fig. 28.) One arm of this bell-crank is united by a link $a^4$ to a stud $b^4$ on the cross-head $B'$, and the other arm is connected by a link $c^4$ to the arm $u^3$ of the bell-crank $B^2$. It will be seen that in the vertical reciprocating movement of the spindle $D$ the pasting-brush is revolved, and in its revolution comes in contact with the paste-roller $Y'$, which is intermittingly turned by a ratchet device $d^4$ and a link $e^4$ attached to the arm $u^3$ of the bell-crank $B^2$. This mechanism is so arranged that the paste-brush makes one revolution only, each time a wrapper is brought into position to be pasted, and in this revolution it takes a supply of paste from the paste-roller, which is moved a portion of a revolution at each quarter-revolution of the intermittently-rotated table.

Figure 37:
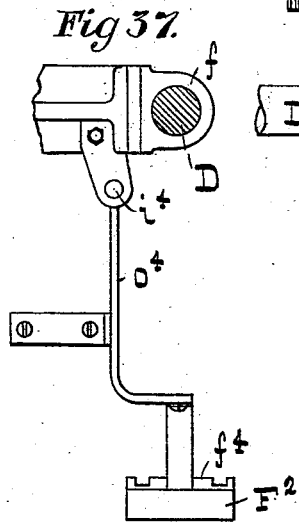
Figure 38:
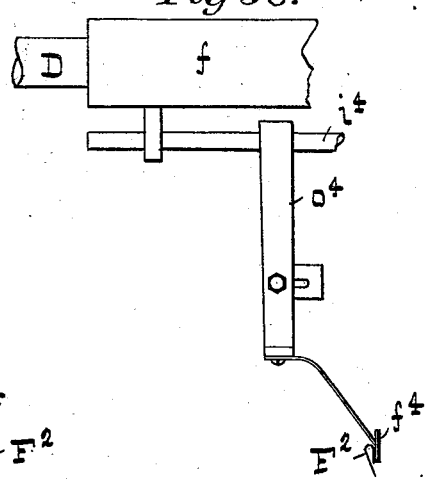

To retain the wrapper firmly in place in its pocket during the stroke of the paste-brush, a holder of some description is necessary. In Figs. 11 and 12 this is shown as consisting of a plate $f^4$ at the end of the long arm $g^4$ of a bell-crank $C^2$, adapted to rock on the stud $h^4$. The short arm of the bell-crank $C^2$ is jointed to a vertical spring-held stem $i^4$, the lower end of which passes through a guide $j^4$ and is provided with a block $k^4$ having a pin $m^4$ at one side. To this pin one arm of a bell-crank $D^2$ is attached, the other arm being fitted with a roller $n^4$, which rests on a cam $E^2$, formed on one side of the master-wheel $M$. The cam $E^2$ is of such character that as soon as the pocket containing a wrapper is brought opposite the pasting devices the plate $f^4$, which has been elevated, is pressed down onto the wrapper and holds it until the pasting operation is completed. A better plan, however, is illustrated in Figs. 37 and 38, in which the vertical stem $i^4$ is provided with an arm $o^4$, which is bent down at its end and attached to the plate $f^4$.

It is of importance that the pasted portion of the wrappers should be of a uniform and predetermined width; but to effect this by adjustment of the pasting-brush alone is practically impossible. I therefore provide the plate $f^4$ with a shield $F^2$, (see Figs. 37 and 38,) which covers all of the wrapper exposed by the plate $f^4$ except that part which is to be pasted. The pasting-brush is then set so as to strike the shield as well as the wrapper, and the result is that a thorough pasting is effected, and the pasted portion has a well-defined inner edge.

The devices for preparing the charge of tobacco which ultimately becomes the filler of the cigarette and placing the same in such position as will admit of its being deposited on the rolling-up table will now be described.

By reference to Figs. 9, 10, 20, 21 and 39 it will be seen that in the rear of each wrapper-pocket is a filler-pocket $a^5$, into which the charge of tobacco cut from the compressed filler falls. These filler-pockets have each a plate $b^5$ of such shape as to form not only a bottom to the pocket but also a back, which back, when the bottom is in a horizontal position, bears against the rear wall of the opening. (See Figs. 39 and 44.) These plates are hinged to the under side of the intermittently-rotated table $E$, and springs $c^5$, Fig. 18, are coiled about the pin $d^5$ of the hinge to keep the plates yieldingly in the position described. The members of the hinge which move with the plate $b^5$ have small arms $e^5$, Fig. 44, which normally rest under the holes $f^5$ (see Fig. 20) in the said intermittently-rotated table, and at one point in the revolution of the table certain pins, hereinafter described, descend through the holes $f^5$ and striking the arms $e^5$ partially invert the plates $b^5$ so as to drop the filler-charge onto the apron of the rolling-up table, as will hereinafter fully appear. At other times the plates rest on the upper face of the head C and cannot be turned down by force applied to them from the top side.

$G^2$ is a trough bolted to the frame B and also to a bracket $H^2$ on the central boss $f$, diametrically opposite the device for punching the wrapper from the leaf. Within this trough are two pulleys $I^2$ and $J^2$, and around these is stretched the lower feeding-belt $K^2$ for the compressed filler. The pulley $I^2$ has an intermittent movement derived from the shaft $L^2$, as hereinafter described. To effect this intermittent movement, the secondary shaft N carries a miter pinion $M^2$ in gear with a similar pinion $N^2$ on a counter-shaft $O'$. (See Figs. 9, 10 and 31.) At the end of the counter-shaft $O'$ is a grooved arm $P^2$, carrying a block $i^5$, which is adjustable in distance from the center of the counter-shaft by means of a screw. The block $i^5$ has a pin $j^5$, which is connected to a ratchet-arm $k^5$ on the shaft $L^2$ by means of a rod $m^5$. This ratchet-arm $k^5$ has a pawl $n'$, (shown only in dotted lines in Fig. 9,) the end of which rests on the circumference of a ratchet-wheel $Q^2$ on the shaft $L^2$. From this description it will be seen that the secondary shaft revolves in common with the counter shaft, and that the proportion of the revolution which the shaft $L^2$ makes at each complete turn of the counter-shaft depends entirely on the distance of the block $i^5$ from the center of it. In other words, by moving out the block, the pawl has a greater stroke, and takes in, in its return or clicking movement, a greater number of the ratchet-teeth. On the shaft $L^2$ is a sprocket-wheel $n^5$ which, through the medium of a chain-belt $o^5$, drives a similar sprocket $p^5$ on the shaft of the pulley $I^2$, which is the driving-pulley for the lower feeding-belt $K^2$. The upper feed-belt is denoted by $R^2$ and it is supported by two pulleys $S^2$ and $T^2$, the latter of which is driven from the shaft $L^2$ by means of the gears $U^2$ and $V^2$.

$W^2$ is a presser-foot adapted to have a vertical movement in the inner end of the feed-trough $G^2$ to compress the continuous filler at that point. It is arranged to slide in grooves in the side walls of the filler-trough and to lift before any movement of tobacco in the trough toward the center of the machine, effected by the feed-belts before described, takes place.

To effect the upward motion of the presser-foot and to allow of its having a yielding pressure on the filler, the presser-foot is fitted with two stems $q^5$, which project from its upper edge and pass loosely through lugs $r^5$ on the cross-head $B'$. (See Figs. 47 and 48.) The lift of the presser-foot is regulated by the position of the nuts $s^5$ on the stems $q^5$ and the downward pressure of the foot by the strength of the springs $t^5$ coiled about the stems which bear endwise against the lugs $r^5$ and the top edge of the presser-foot.

In front of the presser-foot is a sliding block $A^3$, having a knife $a^6$ at its lower end which is closely in contact with the inner face of the presser-foot. This knife shears off the portion of the compressed filler which is projected by the feed mechanism beyond the presser-foot, and allows it to fall to that filler-pocket $a^5$ in the intermittently-rotated table, which at the time is directly below it. This knife-block has a stem $b^6$ whereby it is fastened to the cross-head $B'$, and it consequently has a vertical reciprocating motion in unison with the cross-head.

In the side of the sliding knife-block $A^3$ next to the center of the machine is a cavity in which is seated a vertically-moving plunger $B^3$, which serves to slightly compress the tobacco sheared off by the knife after it is dropped into the filler-pocket. Its movement, effected as hereinafter described, is so timed that it comes into contact with the charge as soon as the same has reached the bottom of the pocket. In order to somewhat round up the filler-charge in the pocket, in the compressing operation described, and thereby better adapt it for subsequent manipulations, the lower end or edge of the compressing-plunger $B^3$ is made hollow, as shown in Fig. 47.

To accomplish the movement of the plunger $B^3$, hereinbefore briefly referred to, I employ a rod $C^3$, which is suitably guided and supported, and to the upper end of it secure an arm $D^3$ having at its end two small rods $c^6$, which are attached to the plunger. Movement is given to the rod $C^3$ through the agency of a cam $E^3$, Fig. 2, on a shaft $F^3$, not before referred to, and a bell-crank $G^3$, one arm of which is pivoted to the said rod, and the other provided with a roller $d^6$ which rests on the cam $E^3$. A spring $f^6$, as in the other cam movements described, serves to keep the roller in contact with the cam. (See Fig. 2.)

$H^3$ is the rolling-up table on which the wrapper is applied to the filler. It is situated on the side of the machine opposite to the pasting devices and partially under the head C and the intermittently-rotated table E. To admit of this situation of the rolling-up table the opening $c$ in the frame at that side of the machine is continued to the top and the head cut away. The rolling-up table is secured to the frame by two brackets $I^3$, one on each side, and has a curved surface after the manner of tables of this class.

$J^3$ is the rolling-up apron, (see Fig. 26,) permanently attached at one end to a rod $K^3$, supported by the bars $L^3$, secured to the sides of the table $H^3$. At the other end the apron is secured to a cross-lever $M^3$, fulcrumed at $g^6$ to the table $H^3$, and pivoted to the upper end of a link $N^3$, jointed to another link $O^3$ hinged to a bracket P³, which is bolted to a hanger Q³ pendent from the table H³. At the point of connection of the links N³ and O³ is a roller $h^6$, which rests on a cam $i^6$, on the shaft F³, which is under the rolling-up table H³. This shaft F³ is driven from the secondary shaft N by the gears R³ and S³, the last named being on the shaft F³. A spring T³ serves to move the lever M³ in the direction opposite to that effected by the cam $i^6$.

U³ is a shaft supported by brackets $k^6$, bolted to the base A, carrying the rolling-up arms V³, which are side by side, and at their upper ends united by the bunching-roller $m^6$, over which the apron J³ is drawn.

The upper part of the table H³ is formed of a block A⁴, and near its rear end is formed the pocket or loop shown in Fig. 15, into which the charge of tobacco to form a filler is finally deposited to be rolled up in the pasted wrapper.

The means for forming the pocket in the apron J³ consists of a transverse finger $n^6$, having at its end a hub $o^6$, whereby it is fastened to the top of a vertically-moving bar $p^6$, suitably guided in brackets $q^6$. The lower end of this bar is hinged in any suitable manner to a lever $r^6$, pivoted to the hanger Q³. A roller $s^6$ on the lever $r^6$ rests on a cam B⁴ on the shaft F³. A spring (shown only in dotted lines, Fig. 15) is coiled about the rod $p^6$ and compressed between the upper bearing-bracket $q^6$ and a collar $t^6$ on the rod, and serves to keep the roller $s^6$ in contact with the cam. To get the vibratory movement of the rolling-up arms V³, the shaft U³ has an arm C⁴, carrying a roller $v^6$, which is held in contact with the cam D⁴ by means of a spring E⁴. If desired the spring E⁴ may be assisted by another, as shown in Figs. 13 and 14. As a pocket containing a wrapper and another containing a charge of filler come over the rolling-up table the wrapper has to be deposited on the rolling-up apron and the charge of filler dropped into the loop or pocket formed in the same. The first of these operations is performed by means of the following described mechanism: The sliding doors $b^2$ in the wrapper pocket at this time are supporting the wrapper, and before the wrapper can be carried down to the apron these doors must be separated and moved out of the way. It will be remembered that the pins $g^2$, which project above the intermittently-rotated table E and have rollers on their ends, are in curved slots $h^2$, which allow of the pins being drawn back to open the doors. This is accomplished by the ends of the pins with their rollers entering a plate F⁴, Fig. 27, having a groove $a^7$, which is concentric with the path of the said pins in the revolution of the table E. This grooved plate slides forward and backward in grooved guides $b^7$ bolted to the upper side of the plate F. (See Fig. 4.) When the plate F⁴ is in its extreme forward position, the pins $q^2$ enter its groove without deviating from their path, and consequently the doors $b^2$ are not opened. To draw the plate F⁴ back, and thereby simultaneously open the doors $b^2$, the said plate is provided near its rear end with a slotted lug $c^7$ connected to a pin $d^7$ in a short cross-lever $e^7$ pivoted to the arm G⁴, which, like the other arms, extends from the central bearing $f$ of the plate F. The upper end of this cross-lever $e^7$ has a pin $f^7$ carrying a roller $g^7$ which rests in a slot $h^7$ in a hanger H⁴ dependent from the vertically-moving cross-head B'. The upper and major portion of the slot $h^7$ is straight and vertical, but the lower portion is curved and turns inward toward the center of the machine. When the pin and roller are at the end of the inwardly-curved portion of the slot $h^7$, the doors are closed, but upon the downward movement of the cross-head B' and the hanger H⁴ the roller is guided into the straight part of the slot, and by this motion the plate F⁴ is drawn back or toward the center of the machine, and the doors $b^2$ thereby opened.

To open the bottom of the filler-pocket and discharge its contents to the pocket in the rolling-up apron, a stem I⁴ is attached to the arm J⁴ of the cross-head B' and guided in a boss K⁴ on the arm G⁴. (See Fig. 27.) On this stem I⁴ are two elongated heads L⁴ carrying two rods $i^7$, (see Figs. 1, 11 and 39,) which pass through slots $j^7$ in the sliding plate F⁴ and through holes $f^5$ in the intermittently-rotated table E, so as to strike the arms $e^5$ on the hinge-pins of the filler-pocket bottom $b^5$ as the cross-head descends. When the wrapper is brought over the rolling-up apron, it is resting on the sliding doors $b^2$, and should the doors open or disappear without the wrapper being supported the wrapper would fall to the apron and become disarranged. To obviate this and conduct the wrapper in an extended and straight condition to the apron, the wrapper is carried down between a top presser and yielding supporting-rods underneath. The presser consists of a plate M⁴, Figs. 13, 29 and 30, on a stem N⁴ guided in a boss O⁴ on the arm G⁴. The upper end of the stem N⁴ is fastened to an arm P⁴ on a rod Q⁴ guided in any suitable manner and pivoted to a lever R⁴ hinged to the hanger Q³. A roller $m^7$ on this lever bears on the edge of a cam S⁴ on the shaft F³. A spring, as in the other cam mechanisms described herein, keeps the roller $m^7$ in contact with the cam S⁴. Referring to Figs. 29 and 30, it will be seen that the presser-plate M⁴ is provided at its under side with a hinged spring-held holding-plate T⁴ having fingers $o^7$. The object of this attachment to the presser-plate M⁴ is to hold the wrapper on the apron until the rolling-up operation has fully commenced and there is no danger of the wrapper becoming displaced. The rise of the presser-plate does not take place until the loop or pocket of the apron has passed onto the fingers $o^7$, but when the wrapper is fully caught the spring-plate is drawn from the wrapper and ascends with the presser. A stem U⁴, Figs. 11 and 23, directly under the one N⁴ has heads $p^7$, from which project upward four or more small spring-held rods $q^7$. The lower end of the stem $U^4$ is jointed to a lever $V^4$ fulcrumed to the hanger $Q^3$. This lever has a roller $r^7$, which bears on the edge of the cam $W^4$ on the shaft $F^3$. In the upward motion of the stem $U^4$ the four small rods $q^7$ are passed through holes in the rolling-up table and similar holes in the apron and through the slots $s^7$, Figs. 18, 19 and 20, in the sliding doors $b^2$, so as to come in contact with the under side of the wrapper. In this operation the small rods $q^7$ touch the under side of the wrapper at the same moment that the presser $M^4$, or rather its hinged plate $T^4$, comes in contact with its upper side. At this time the sliding doors $b^2$ open, and then the presser descends, together with the supporting-rods, and the wrapper is placed on the rolling-up apron in a straight and extended condition. The presser then ascends and the four supporting-rods fall below the surface of the table so as to clear the rolling-up apron. The rolling-up levers now move outward and complete the cigarette, except as to its length, which falls to a chute $X^4$ leading to some suitable receptacle. The cigarette, formed as described, does not, however, have square ends, and the filler projects somewhat beyond the wrapper, and as absolute uniformity in length is required the cigarette before passing to the chute must have its ragged ends cut off.

To accomplish this, the cigarette drops on two spurs $A^5$, which are sharpened at the edges and form a continuation of the sides of the chute $X^4$. A small shaft $A^8$, supported over the chute $X^4$, carries two curved knives $B^5$, which, after the cigarette is caught by the spurs, are suddenly thrown down and in connection with the sharpened edges of the spurs shear off the ragged ends of the cigarette and allow the perfected cigarette to fall to the chute.

To force the uncut cigarette onto the spurs, extensions of the sides of the chute are provided with spring-wires $b^8$, which are carried back or compressed by the rod $m^6$, which connects the ends of the rolling-up levers $V^3$. As the said levers move back, the compressed springs, in assuming their original position, press on the cigarette while it is leaving the rolling-up apron, and force it onto the spurs.

To effect the operation of the knives $B^5$, their pivoted shaft $A^8$ has an arm $a^9$, which is connected by a link $b^9$ to a lever $c^9$ (see Fig. 50) secured by a lug $d^9$ to some part of the frame B. (Not shown.) The lever $c^9$ has a tooth $e^9$, which rests with spring-tension against the circumference of a disk $f^9$ on the shaft $F^3$, which disk has an indentation $g^9$ into which the tooth $e^9$ will enter once at each revolution of the shaft $F^3$, and thereby cause the knives $B^5$ to perform their cutting stroke.

As the starting and stopping of the machine has to be under the control of the attendant sitting at the table $A'$, and as his hands are at all times occupied in placing tobacco-leaves under the wrapper-cutting punch, the movement of the clutch I has to be operated by foot-power. I therefore attach to the lower end of the hand-lever K a link $A^9$, which connects it to an arm $B^9$ attached in any suitable manner to a treadle $C^9$. On this treadle the operator places his foot.

Inclined spouts $C^5$ situated outside of the chute $X^4$ receive and carry off the ends of the cigarette severed by the knives.

The general operation of the machine is as follows: The operator, standing in front of the stationary table, as soon as the punch is elevated, places a tobacco-leaf under it. The punch on entering the die cuts a wrapper from the leaf. The supporting-stems have meantime come up from below to a point level with the top of the die, which is their highest point. The plunger-plate inside the punch, when the punch is at its highest elevation, stands above the lower edge of the punch, but in descending has a faster motion than the punch, and descends with the punch until the leaf which rests above the die and on the supporting-stems is caught between the stems and the plunger, and held by them when the wrapper is cut. The supporting-stems are each independently elastic, being mounted on a spring, so that should there be any irregularity in their length the long one would be pushed down by the plunger-plate and the level of their tops maintained. So, too, if a vein in the wrapper should fall on top of one stem, that stem would be independently depressed and the others still maintain their hold upon the wrapper. The plunger and stems holding the wrapper then descend together, under the influence of their respective cams, until the stems have passed below the sliding doors and the wrapper lies upon them, held down by the plunger-plate. Before raising the plunger-plate the wrapper must be caught and securely held by suitable devices so as not to become displaced. These devices, before fully described, consist of the spring-fingers $v^2$ $v^2$, carried by the rotating sleeve $P'$. When the intermittently-rotated table E turns and carries a wrapper-pocket under the punch to receive a wrapper, the same motion of the table raises the vertical rack $N'$ and the fingers $v^2$ into a vertical position the rack $N'$ rests upon the wedge $c^3$, which is controlled by a cam and lever which are so arranged that at the instant at which the wrapper rests upon the bed the wedge $c^3$ is withdrawn from below the rack $N'$, and the fingers descend upon the edge of the wrapper and hold it. The plunger-plate then rises, and the table E moves a quarter of a revolution and stops, which brings the pocket containing a wrapper, still held by the spring-fingers $v^2$ $v^2$, opposite the pasting devices. The holding-plate $f^4$ and its shield $F^2$ (shown in Figs. 37 and 38) descend and rest upon the wrapper, leaving only a small portion exposed at the front edge, to which paste is applied by a revolution of the pasting-brush. The continued revolution of the cam $E^2$ brings the high portion of said cam in contact with the roller $n^4$ and lifts the holding-plate from the wrapper, and leaves the table free to move again, which it does, turning a quarter of a revolution. The wrapper is still held by the fingers $v^2$. There is a table (not shown) placed over the filler-feeding trough, having an opening through which loose tobacco is inserted in the said trough and packed down onto the lower feeding-belt to a proper consistency and thickness by a second attendant. This layer of filler is of a width equal to the length of the cigarettes to be made, and is carried by the belt on which it is placed, under the upper feed-belt $R^2$ and presser-foot $W^2$, toward the center of the machine, and at the time of the arrival of the pasted wrapper, carried by the intermittently-rotating table, opposite to it a proper length of compressed filler equal when compressed to the diameter of a cigarette has been projected beyond the inner face of the presser-foot and under the shearing-knife. The rotation of the table E carrying the wrapper has also brought under the shearing-knife and its compressing-plunger a filler-receiving pocket which is immediately in the rear of the wrapper-pocket. The knife now descends and the projecting portion of filler is sheared off and falls into the filler-receiving pocket, and rests on its bottom, which is provided with ribs or corrugations to prevent the filler shifting sidewise by the rapid motion of the revolving table. Following the shearing-knife the filler-former or compressing-plunger $B^3$ descends and shapes and consolidates the filler in the filler-pocket. The intermittently-rotating table now moves again another quarter-revolution, which brings the filler and wrapper over the rolling-up table. Just prior to the arrival of the filler and wrapper over the rolling-up table, the finger $n^6$, actuated by the cam $B^4$, has pressed the apron $J^3$ down and formed a depression to receive the filler, and immediately ascends, getting out of the way of the filler. It is now necessary to drop the filler into the pocket of the rolling-up apron, and lay the wrapper upon the apron simultaneouly. The filler is dropped as follows: The pins $i^7$, actuated by the cross-head B' and its attachments, pass down through the slots $j^7$ in the sliding plate $F^4$ and the holes $f^5$ in the table E, and, striking upon the ends of the levers on the ends of the hinge-pins of the bottom plate of the filler-pocket, depress it and drop its contents into the loop or pocket of the rolling-up apron. Simultaneously with this action the rods $q^7$, actuated by the cam $W^4$, pass up through the holes in the rolling-up table and apron and also through the slots in the sliding doors $b^2$ until they bear against the under side of the wrapper which is resting upon the doors, lifting the wrapper slightly off the doors. At the same time the rod $N^4$, carrying its presser-plate $M^4$ and hinged finger-plate $T^4$, descends, actuated by its cam $S^4$, and rests upon the top of the wrapper which is supported by the rods from below. Just prior to the wrapper reaching its position over the rolling-up table, the fingers $v^2$ have released their hold upon the wrapper. After the wrapper has been caught between the rods $q^7$ and the presser-plate $M^4$, the descent of the cross-head B' carries the slotted arm $H^4$ down, actuates the lever $e^7$, and moves the sliding plate $F^4$ backward toward the center of the machine, the rollers $g^2$, which project through the intermittently-rotated table E, having meanwhile passed into the groove $a^7$ in plate $F^4$, which is drawn back by them, and the doors $b^2$ $b^2$ are opened sidewise, quickly from beneath the wrapper, leaving it held and stretched between the presser-plate $M^4$ and the rods $q^7$. The shape of the cams $W^4$ and $S^4$ is such that the presser-plate $M^4$ and the rods $q^7$ will now be caused to descend together, still holding the wrapper between them. As the rods $q^7$ pass below the rolling-up apron, the wrapper will rest upon it and be held there firmly by the presser-plate $M^4$. The bunching-roller $m^6$, actuated by its levers $V^3$, now moves forward, rolling the filler within the rolling-up apron, and still forward until it has caught the edge of the wrapper and the fingers $o^7$ of the hinged plate $T^4$, when it stops for an instant and the presser-plate $M^4$ ascends, drawing the fingers $o^7$ from under the roller. The roller then continues and completes the rolling of the wrapper upon the filler and delivers it upon the spurs $A^5$. When the presser-plate $M^4$ has passed up through the wrapper-pocket $a^2$, the doors $b^2$ close and the table E revolves and brings the pocket under the wrapper-cutter for another wrapper. The knives now drop and sever the ragged ends of the cigarette and it is finished.

It will be understood that four distinct operations—that is to say, cutting a wrapper, pasting a wrapper, cutting a filler, and rolling up the filler in a wrapper—are performed simultaneously, which results in the production of a completed cigarette at each quarter of a revolution of the table E. In other words, four complete cigarettes are made during one revolution of the said table.

A tobacco-cigarette wrapper in the moist condition in which it has to be worked is frail, besides being sticky, and is difficult to handle. To handle it successfully it is necessary that it should never be released from the moment at which it is cut from the leaf until it is wrapped in a pasted condition upon the filler. To accomplish this result I use the devices and the succession of movements described herein.

As soon as the leaf is stretched across the die it is caught between the stems and plunger-plate, and while so held is cut from the leaf. By the stems and plunger-plate it is placed flat and undisturbed on the doors forming the bottom of the pocket prepared for its reception. It is then caught at its inner edge by the spring-fingers, by which it is firmly held until it is delivered to the devices employed to place it upon the rolling-up table. In order to insure against its disturbance by the action of the pasting-brush, it is held by a holding-plate, which rests upon it while it is being pasted. It then passes to the rolling-up table, and while still resting upon the sliding doors is caught between the presser-plate and the six upwardly-moving rods, by which it is raised slightly from the sliding doors and supported. The doors are then withdrawn and the wrapper still held between the rods and the presser-plate is lowered to the rolling-up apron, the rods passing through and below the apron and leaving the wrapper resting thereon still held firmly down and flat by the presser-plate. The bunching-roller then rolls the filler in the apron and comes forward and securely bites the edge of the wrapper before the presser-plate releases it. It is then rolled and the cigarette is finished. It is thus seen that there is no instant during which the wrapper is not securely held and prevented from buckling or getting out of place.

I claim as my invention—

1. In a machine for making all tobacco cigarettes, the combination of a wrapper pocket having a perforated bottom, a die situated over the wrapper pocket, a punch adapted to enter the die, a plunger plate arranged to have a reciprocating movement within the punch, stems which pass through the perforations in the pocket bottom and serve to support the cut wrapper, and means to effect the operation of the punch and plunger plate, separately, and other means to cause the stems to co-operate with the plunger plate so as to clamp the cut wrapper and carry it down in an extended condition to the perforated pocket bottom, substantially as specified.

2. In a machine for making all tobacco cigarettes, the combination of a wrapper pocket having a perforated bottom, a die situated over the pocket, a punch adapted to enter the die, a plunger plate arranged to have a reciprocating movement within the punch, stems which pass through the perforations in the pocket bottom and serve to support the cut wrapper, mechanism to effect the operation of the punch and plunger plate and the co-operation of the stems with the plunger plate to clamp the wrapper and convey it in an extended condition to the bottom of the wrapper pocket, and means to move the pocket inclosing the wrapper away, or from under the punch and die, substantially as specified.

3. In a machine for making all tobacco cigarettes, the combination with a wrapper pocket having a perforated bottom, and a punch and die situated over the pocket, a plunger plate adapted to rest within the punch and means to carry it downward from, and out of the punch, a series of stems which penetrate the perforated pocket bottom and mechanism to bring the upper ends of the stems up to the plunger plate and then effect their movement in common with the plunger plate until the wrapper situated between them is deposited upon the pocket bottom, substantially as specified.

4. In a machine for making all tobacco cigarettes, a wrapper pocket having a slotted bottom and means for opening the bottom, combined with a wrapper-carrying plunger plate situated above the pocket, mechanism to effect a reciprocating motion of the plunger plate, a series of stems which penetrate the pocket bottom, through the slots and devices to effect a reciprocating motion of the stems, substantially as specified.

5. In a machine for making all tobacco cigarettes, the combination of a rolling-up table having openings therein, and an apron with openings therein which register with those in the table, a presser plate to push a cigarette wrapper down to the apron with means to effect a vertical reciprocating movement of the presser plate, and a series of rods with devices to bring their upper ends into contact with the under side of the wrapper, and then carry them down with the presser plate and wrapper, until the wrapper is seated on the rolling up apron, substantially as specified.

6. In a machine for making all tobacco cigarettes, the combination with a table having a wrapper pocket provided with an opening bottom and means for operating it, of a rolling up table and an apron having openings which register one with the other, a presser plate with means to push it down through the wrapper pocket as the bottom thereof is opened and thereby press the wrapper to the rolling up apron, reciprocating rods which pass up through the openings in the said rolling up table and apron, and mechanism to effect a common movement of the said rods and the presser plate, whereby the wrapper while supported from above and below, is transferred from the pocket to the rolling up apron, substantially as specified.

7. In a machine for making all tobacco cigarettes, the combination of an intermittently rotated table having a wrapper pocket with a perforated bottom, a die situated over the wrapper pocket, a punch with means to reciprocate it and thereby move its cutting edge into, and out of the die, a plunger plate with devices to move it into, and out of the punch, stems which pass through the perforations in the bottom of the pocket with means to operate them, the said stems being lowered by the said plunger plate, to seat the wrapper, and fingers with means to operate them to hold the wrapper to the bottom of the pocket as the plunger plate ascends and leaves the wrapper and the table moves on, substantially as specified.

8. In a machine for making all tobacco cigarettes, the combination of a table having a wrapper pocket, a wrapper holder and shield of a width less than the wrapper, with means to bring them down onto the wrapper while the same is seated in the pocket, and a pasting brush with devices to revolve it and thereby apply paste to the exposed portion only of the wrapper, substantially as specified.

9. In a machine for making all tobacco cigarettes, the combination of a table having wrapper and filler pockets, a punch and die situated over the said table, devices to place a wrapper cut by the punch and die into a wrapper pocket, a filler making device with means to deliver the filler into a filler pocket, a rolling-up table and apron, means to intermittingly revolve the table, and mechanism to deposit the wrapper and filler onto the apron of the rolling-up table, the said operations being performed successively, substantially as specified.

10. In a machine for making all tobacco cigarettes, a rolling up table and apron and means to operate the apron, combined with a revoluble table arranged over the rolling up table, having wrapper and filler pockets in pairs, devices to charge the said pockets respectively with wrappers and fillers, wrapper pasting apparatus, and mechanism to intermittently rotate the table and thereby bring the pockets in pairs, that is to say, a filler pocket and a wrapper pocket, successively over the said rolling up table and to discharge their contents to the apron thereof, substantially as specified.

11. In a machine for making all tobaccco cigarettes, a rolling up table and apron and means to operate the apron, combined with a revoluble table arranged over the rolling up table, having pockets for fillers, and others for the wrappers so relatively placed as to admit of a filler and a wrapper pocket being brought simultaneously over the rolling up table, a punch and die in the circular path of the wrapper pockets to cut wrappers, and attendant devices to deposit the cut wrappers in the wrapper pockets, a pasting apparatus, a filler feeding apparatus, a knife to cut from a continuous filler charges for the filler pockets, mechanism to intermittently move the table and thereby bring a wrapper and filler together over the rolling up table and conduct the same to the apron thereof, substantially as specified.

12. In a machine for making all tobacco cigarettes, a revoluble table having wrapper and filler pockets in pairs arranged on common radial lines and at equal circumferential distances apart, wrapper and filler cutting devices on a diametrical line on opposite sides of the revoluble table, pasting and rolling up apparatus on a diametrical line at a right angle with the first diametrical line, mechanism to intermittingly revolve the table, and bring each pair of pockets successively to the wrapper cutting devices, the pasting devices, the filler feeding devices, and the rolling up table, and mechanism to charge the said pockets and discharge them to the rolling up table, combined substantially as specified.

13. In a machine for making all tobacco cigarettes, the combination of rolling up mechanism, a revoluble table having pockets for wrappers, with mechanism to carry the said pockets over the rolling up mechanism, a punch and die to cut wrappers, together with means to push the punched out wrappers to their pockets, and other means to support the wrappers in their passage to the said pockets from the under side thereof, until seated on the bottom of the pockets, substantially as specified.

14. In a machine for making all tobacco cigarettes, an intermittently rotated table having pockets adapted to receive charges of tobacco which ultimately become fillers, a feeding mechanism, a knife to shear off charges of filler, a plunger to press the charges in the pockets, a rolling up table, and devices to drop the charges from their pockets onto the said table as the latter moves from the filler feeding mechanism and as the pockets come over the same, combined substantially as specified.

15. In a machine for making all tobacco cigarettes, a revoluble table having pockets for wrappers with opening bottoms, a punch and die to cut wrappers, and mechanism to convey the wrappers from the punch and die to their pockets, a rolling up table and apron, mechanism to rotate the pocketed table and bring the pockets containing wrappers, in succession, over the rolling up table, devices to open the bottoms of the pockets while the same are over the rolling up table, and others to support the wrappers from the bottom after the opening of the bottom doors, and mechanism to push the supported wrappers to the rolling up apron, combined substantially as specified.

16. In a machine for making all tobacco cigarettes, an intermittently rotated table having pockets for fillers, with invertible bottoms, apparatus to charge the said pockets, a rolling up table and apron, devices to rotate or turn the pocketed table and bring the charged pockets in succession over the rolling up apron, and mechanism to invert the said bottoms and thereby drop the contained charges to the loop of the rolling up apron, combined substantially as specified.

17. In a machine for making all tobacco cigarettes, the combination of rolling up mechanism, an intermittently rotated table having pockets for wrappers, with opening bottoms, devices to open the bottoms, mechanism to cut wrappers and insert them in a supported condition in the said pockets and onto the opening bottoms thereof; fingers with means to make them fall on and hold the wrappers on the said bottoms and thereby prevent their subsequent displacement as the table moves, and until the said wrappers are carried down to the rolling up apron, substantially as specified.

18. In a machine for making all tobacco cigarettes, a revoluble table having pockets for wrappers, and devices to cut the wrappers and insert them in the pockets, a pasting device, mechanism to bring the charged pockets to the pasting device, a plate which is brought down onto each wrapper to hold it during the pasting operation, and means for operating it, all combined substantially as specified.

19. In a machine for making all tobacco cigarettes, an intermittently rotated table having a pocket for wrappers and means to place a wrapper in the pocket, a paste receptacle, mechanism to bring the pocket with its contained wrapper to the paste receptacle, a shield adapted to cover only a portion of the wrapper with devices to bring the shield down onto the wrapper, and mechanism to take paste from the receptacle and apply it to the shield and wrapper, combined substantially as specified.

20. In a machine for making all tobacco cigarettes, a rotating table having a wrapper pocket with a bottom in sections, means to place a wrapper in the pocket, a rolling up table and apron, means to separate the sections of the pocket bottom, and devices to carry the wrapper through the pocket to the rolling up apron, combined substantially as specified.

21. In a machine for making all tobacco cigarettes, a rotary table having pockets for wrappers, combined with a pasting device which consists of a paste box, a roller which is coated with paste from the box and a rotary brush with means to intermittently rotate it and thereby take paste from the roller and transfer it to the edge of the wrapper in the pocket, substantially as specified.

22. In a machine for making all tobacco cigarettes, a revoluble table having a wrapper pocket with an opening bottom, a rolling up table and apron, means to bring the wrapper pocket with its contained wrapper over the rolling up apron, means to open the pocket bottom, a plate with actuating devices to press the wrapper down through the wrapper pocket and onto the rolling up apron, rods and means to bring them through openings in the pocket bottom and into contact with the wrapper, and then support it while in its downward movement until it reaches, and is seated on the rolling up apron, combined substantially as specified.

23. In a machine for making all tobacco cigarettes, the combination of a revoluble table having wrapper pockets with opening bottoms, a rolling up table and apron, means to bring the wrappers over the rolling up table and apron, a presser plate to push the wrappers down to the apron and means to operate it, a spring-held plate hinged to the presser plate, which remains on the wrapper after the presser plate is raised and which is drawn from under the rolling up apron in the rolling up operation, devices to co-operate with the presser plate to support the wrappers from the under side in their transfer from the wrapper pockets to the rolling up apron, and mechanism to open the bottoms of the wrapper pockets to admit of the discharge of the wrappers therefrom, substantially as specified.

JACOB S. DETRICK.

Witnesses:
   DANL. FISHER,
   GEO. E. TAYLOR.